(12) United States Patent
Haberman et al.

(10) Patent No.: US 7,657,428 B2
(45) Date of Patent: Feb. 2, 2010

(54) SYSTEM AND METHOD FOR SEAMLESS SWITCHING OF COMPRESSED AUDIO STREAMS

(75) Inventors: Seth Haberman, New York, NY (US); Gerrit Niemeijer, Maplewood, NJ (US); Thomas Boltze, Shanghai (CN); Alex Jansen, New York, NY (US)

(73) Assignee: Visible World, Inc, New York, NY (US)

( * ) Notice: Subject to any disclaimer, the term of this patent is extended or adjusted under 35 U.S.C. 154(b) by 1643 days.

(21) Appl. No.: 10/192,192

(22) Filed: Jul. 9, 2002

(65) Prior Publication Data

US 2003/0045957 A1    Mar. 6, 2003

Related U.S. Application Data

(60) Provisional application No. 60/303,846, filed on Jul. 9, 2001.

(51) Int. Cl.
*G10L 19/14*    (2006.01)
*G10L 21/04*    (2006.01)

(52) U.S. Cl. .............................. 704/211; 704/503
(58) Field of Classification Search ............ 704/278
See application file for complete search history.

(56) References Cited

U.S. PATENT DOCUMENTS

| | | | |
|---|---|---|---|
| 3,366,731 A | 1/1968 | Wallerstein | 178/6 |
| 3,639,686 A | 2/1972 | Walker et al. | 178/5.8 R |
| 4,331,974 A | 5/1982 | Cogswell et al. | 358/86 |
| 4,475,123 A | 10/1984 | Dumbauld et al. | 358/114 |
| 4,573,072 A | 2/1986 | Freeman | 358/86 |
| 4,602,279 A | 7/1986 | Freeman | 358/86 |
| 4,625,235 A | 11/1986 | Watson | 358/86 |
| 4,638,359 A | 1/1987 | Watson | 358/147 |
| 4,703,423 A | 10/1987 | Bado et al. | 364/400 |
| 4,716,410 A | 12/1987 | Nozaki | 340/825.52 |
| 4,789,235 A | 12/1988 | Borah et al. | 351/246 |
| 4,814,883 A | 3/1989 | Perine et al. | 358/181 |
| 4,847,698 A | 7/1989 | Freeman | 358/343 |
| 4,847,699 A | 7/1989 | Freeman | 358/343 |
| 4,847,700 A | 7/1989 | Freeman | 358/343 |
| 4,850,007 A | 7/1989 | Marino et al. | 379/67 |
| 4,918,516 A | 4/1990 | Freeman | 358/86 |
| 5,099,422 A | 3/1992 | Foresman et al. | 364/401 |
| 5,105,184 A | 4/1992 | Pirani et al. | 340/721 |
| 5,155,591 A | 10/1992 | Wachob | 358/86 |
| 5,173,900 A | 12/1992 | Miller et al. | 370/110.1 |
| 5,220,501 A | 6/1993 | Lawlor et al. | 364/408 |
| 5,231,494 A | 7/1993 | Wachob | 358/146 |
| RE34,340 E | 8/1993 | Freeman | 358/86 |
| 5,253,940 A | 10/1993 | Abecassis | 400/495 |
| 5,260,778 A | 11/1993 | Kauffman et al. | 358/86 |
| 5,291,395 A | 3/1994 | Abecassis | 364/401 |
| 5,305,195 A | 4/1994 | Murphy | 364/401 |

(Continued)

*Primary Examiner*—David R Hudspeth
*Assistant Examiner*—Brian L Albertalli
(74) *Attorney, Agent, or Firm*—Gary A. Walpert; K&L Gates LLP

(57) ABSTRACT

A system and method for seamless switching and concatenation of compressed audio streams in Internet, Digital Radio, Digital Television, DVD, storage, and other applications. The technology allows switching between streams at pre-determined points without the introduction of audible artifacts. It can be used for the personalization messages such as advertisements, news systems and other.

23 Claims, 22 Drawing Sheets

U.S. PATENT DOCUMENTS

| | | | |
|---|---|---|---|
| 5,343,239 A | 8/1994 | Lappington et al. | 348/12 |
| 5,347,632 A | 9/1994 | Filepp et al. | 395/200 |
| 5,356,151 A | 10/1994 | Abecassis | 273/243 |
| 5,361,393 A | 11/1994 | Rossillo | 395/650 |
| 5,377,354 A | 12/1994 | Scannell et al. | 395/650 |
| 5,414,455 A | 5/1995 | Hooper et al. | 348/7 |
| 5,422,468 A | 6/1995 | Abecassis | 235/380 |
| 5,424,770 A | 6/1995 | Schmelzer et al. | 348/9 |
| 5,426,281 A | 6/1995 | Abecassis | 235/379 |
| 5,434,678 A | 7/1995 | Abecassis | 358/342 |
| 5,442,390 A | 8/1995 | Hooper et al. | 348/7 |
| 5,442,771 A | 8/1995 | Filepp et al. | 395/650 |
| 5,446,919 A | 8/1995 | Wilkins | 455/6.2 |
| 5,448,568 A | 9/1995 | Delpuch et al. | 372/94.2 |
| 5,499,046 A | 3/1996 | Schiller et al. | 348/6 |
| 5,515,098 A | 5/1996 | Carles | 348/8 |
| 5,515,270 A | 5/1996 | Weinblatt | 364/405 |
| 5,519,433 A | 5/1996 | Lappington et al. | 348/2 |
| 5,526,035 A | 6/1996 | Lappington et al. | 348/13 |
| 5,537,141 A | 7/1996 | Harper et al. | 348/12 |
| 5,548,532 A | 8/1996 | Menand et al. | 364/514 C |
| 5,550,735 A | 8/1996 | Slade et al. | |
| 5,566,353 A | 10/1996 | Cho et al. | 455/2 |
| 5,584,025 A | 12/1996 | Keithley et al. | 395/615 |
| 5,585,838 A | 12/1996 | Lawler et al. | |
| 5,585,858 A | 12/1996 | Harper et al. | 348/485 |
| 5,594,910 A | 1/1997 | Filepp et al. | 395/800 |
| 5,610,653 A | 3/1997 | Abecassis | 348/110 |
| 5,617,142 A | 4/1997 | Hamilton | 348/405 |
| 5,632,007 A | 5/1997 | Freeman | 395/75 |
| 5,634,849 A | 6/1997 | Abecassis | 463/30 |
| 5,636,346 A | 6/1997 | Saxe | 395/201 |
| 5,638,113 A | 6/1997 | Lappington et al. | 348/12 |
| 5,652,615 A | 7/1997 | Bryant et al. | |
| 5,671,225 A | 9/1997 | Hooper et al. | 370/468 |
| 5,682,196 A | 10/1997 | Freeman | 348/13 |
| 5,684,918 A | 11/1997 | Abecassis | 386/83 |
| 5,696,869 A | 12/1997 | Abecassis | 386/52 |
| 5,717,814 A | 2/1998 | Abecassis | 386/46 |
| 5,717,923 A | 2/1998 | Dedrick | 395/613 |
| 5,724,091 A | 3/1998 | Freeman et al. | 348/13 |
| 5,724,472 A | 3/1998 | Abecassis | 386/52 |
| 5,724,521 A | 3/1998 | Dedrick | 395/226 |
| 5,734,413 A | 3/1998 | Lappington et al. | 348/12 |
| 5,740,388 A | 4/1998 | Hunt | 395/328 |
| 5,740,549 A | 4/1998 | Reilly et al. | 705/14 |
| 5,754,939 A | 5/1998 | Herz et al. | 455/4.2 |
| 5,758,259 A | 5/1998 | Lawler | |
| 5,761,601 A | 6/1998 | Nemirofsky et al. | 455/3.1 |
| 5,764,275 A | 6/1998 | Lappington et al. | 348/12 |
| 5,768,521 A | 6/1998 | Dedrick | 395/200.54 |
| 5,774,170 A | 6/1998 | Hite et al. | 348/9 |
| 5,774,664 A | 6/1998 | Hidary et al. | 395/200.48 |
| 5,778,181 A | 7/1998 | Hidary et al. | 395/200.48 |
| 5,784,095 A | 7/1998 | Robbins et al. | 348/6 |
| 5,784,528 A | 7/1998 | Yamane et al. | 386/112 |
| 5,796,945 A | 8/1998 | Tarabella | 395/200.9 |
| 5,802,314 A | 9/1998 | Tullis et al. | 395/200.76 |
| 5,805,974 A | 9/1998 | Hite et al. | |
| 5,825,884 A | 10/1998 | Zdepski et al. | 380/25 |
| 5,835,087 A | 11/1998 | Herz et al. | 345/327 |
| 5,861,881 A | 1/1999 | Freeman et al. | 345/302 |
| 5,867,208 A | 2/1999 | McLaren | 348/13 |
| 5,873,068 A | 2/1999 | Beaumont et al. | |
| 5,887,243 A | 3/1999 | Harvey et al. | 455/3.1 |
| 5,903,263 A | 5/1999 | Emura et al. | |
| 5,907,837 A | 5/1999 | Ferrel et al. | 707/3 |
| 5,913,031 A | 6/1999 | Blanchard | 395/200.34 |
| 5,917,830 A | 6/1999 | Chen et al. | 370/487 |
| 5,929,850 A | 7/1999 | Broadwin et al. | 345/327 |
| 5,931,901 A | 8/1999 | Wolfe et al. | 709/206 |
| 5,937,331 A | 8/1999 | Kalluri et al. | 455/6.1 |
| 5,978,799 A | 11/1999 | Hirsch | 707/4 |
| 5,986,692 A | 11/1999 | Logan et al. | 348/13 |
| 5,991,735 A | 11/1999 | Gerace | 705/10 |
| 6,002,393 A | 12/1999 | Hite et al. | 345/327 |
| 6,018,768 A | 1/2000 | Ullman et al. | 709/218 |
| 6,026,368 A | 2/2000 | Brown et al. | 705/14 |
| 6,029,045 A | 2/2000 | Picco et al. | 455/5.1 |
| 6,038,000 A | 3/2000 | Hurst, Jr. | 348/845 |
| 6,038,367 A | 3/2000 | Abecassis | 386/46 |
| 6,049,569 A | 4/2000 | Radha et al. | 375/240 |
| 6,067,348 A | 5/2000 | Hibbeler | 379/88.16 |
| 6,075,551 A | 6/2000 | Berezowski et al. | 348/9 |
| 6,108,486 A | 8/2000 | Sawabe et al. | 386/98 |
| 6,137,834 A | 10/2000 | Wine et al. | 375/240 |
| 6,141,358 A | 10/2000 | Hurst, Jr. et al. | 370/543 |
| 6,160,570 A | 12/2000 | Sitnik | 348/1 |
| 6,304,852 B1 | 10/2001 | Loncteaux | 705/14 |
| 6,327,574 B1 | 12/2001 | Kramer et al. | 705/14 |
| 6,330,286 B1 | 12/2001 | Lyons et al. | |
| 6,343,287 B1 | 1/2002 | Kumar et al. | 707/4 |
| 6,357,042 B2 | 3/2002 | Srinivasan et al. | |
| 6,360,234 B2 | 3/2002 | Jain et al. | |
| 6,408,278 B1 | 6/2002 | Carney et al. | |
| 6,411,992 B1 | 6/2002 | Srinivasan et al. | 709/218 |
| 6,424,991 B1 | 7/2002 | Gish | 709/203 |
| 6,449,657 B2 | 9/2002 | Stanbach, Jr. et al. | 709/245 |
| 6,457,010 B1 | 9/2002 | Eldering et al. | |
| 6,463,444 B1 | 10/2002 | Jain et al. | |
| 6,463,585 B1 | 10/2002 | Hendricks et al. | 725/35 |
| 6,466,975 B1 | 10/2002 | Sterling | 709/223 |
| 6,480,234 B1 * | 11/2002 | Sasaki et al. | 348/512 |
| 6,502,076 B1 | 12/2002 | Smith | |
| 6,567,980 B1 | 5/2003 | Jain et al. | |
| 6,574,793 B1 | 6/2003 | Ngo et al. | |
| 6,588,013 B1 | 7/2003 | Lumley et al. | |
| 6,601,237 B1 | 7/2003 | Ten Kate et al. | |
| 6,611,624 B1 | 8/2003 | Zhang et al. | |
| 6,671,880 B2 | 12/2003 | Shah-Nazaroff et al. | |
| 6,678,332 B1 * | 1/2004 | Gardere et al. | 375/240.26 |
| 6,681,395 B1 | 1/2004 | Nishi et al. | |
| 6,694,482 B1 | 2/2004 | Arellano et al. | |
| 6,698,020 B1 | 2/2004 | Zigmond et al. | |
| 6,735,628 B2 | 5/2004 | Eyal | |
| 6,771,285 B1 * | 8/2004 | McGrath et al. | 715/723 |
| 6,785,289 B1 | 8/2004 | Ward et al. | |
| 6,806,909 B1 * | 10/2004 | Radha et al. | 348/384.1 |
| 6,850,252 B1 | 2/2005 | Hoffberg | |
| 6,857,024 B1 | 2/2005 | Chen et al. | |
| 6,877,134 B1 | 4/2005 | Fuller et al. | |
| 2001/0013124 A1 | 8/2001 | Klosterman et al. | |
| 2002/0026359 A1 | 2/2002 | Long et al. | |
| 2002/0056093 A1 | 5/2002 | Kunkel et al. | |
| 2002/0057336 A1 | 5/2002 | Gaul et al. | |
| 2002/0083443 A1 | 6/2002 | Eldering et al. | |
| 2002/0092017 A1 | 7/2002 | Klosterman et al. | 725/35 |
| 2002/0095676 A1 | 7/2002 | Knee et al. | 725/46 |
| 2003/0110500 A1 | 6/2003 | Rodriguez | |
| 2003/0177503 A1 | 9/2003 | Sull et al. | |
| 2004/0025180 A1 | 2/2004 | Begeja et al. | |
| 2004/0111742 A1 | 6/2004 | Hendricks et al. | |
| 2004/0136698 A1 | 7/2004 | Mock | |
| 2005/0086691 A1 | 4/2005 | Dudkiewicz et al. | |
| 2005/0086692 A1 | 4/2005 | Dudkiewicz et al. | |
| 2005/0166224 A1 | 7/2005 | Ficco | |

* cited by examiner

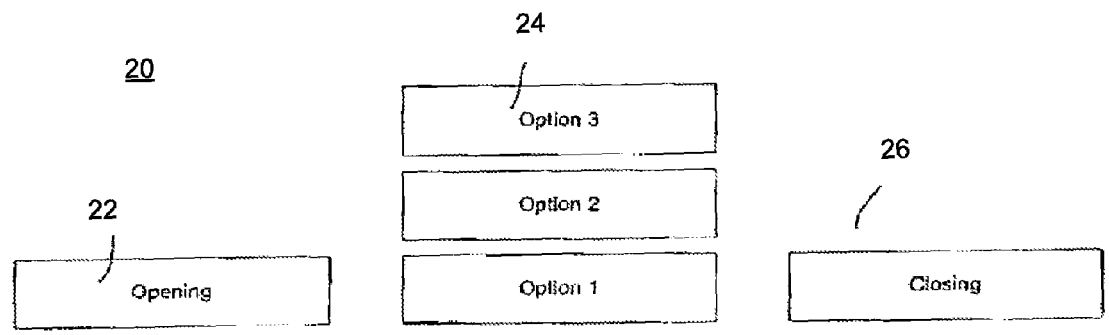
Fig. 1: A very simple personalized message structure
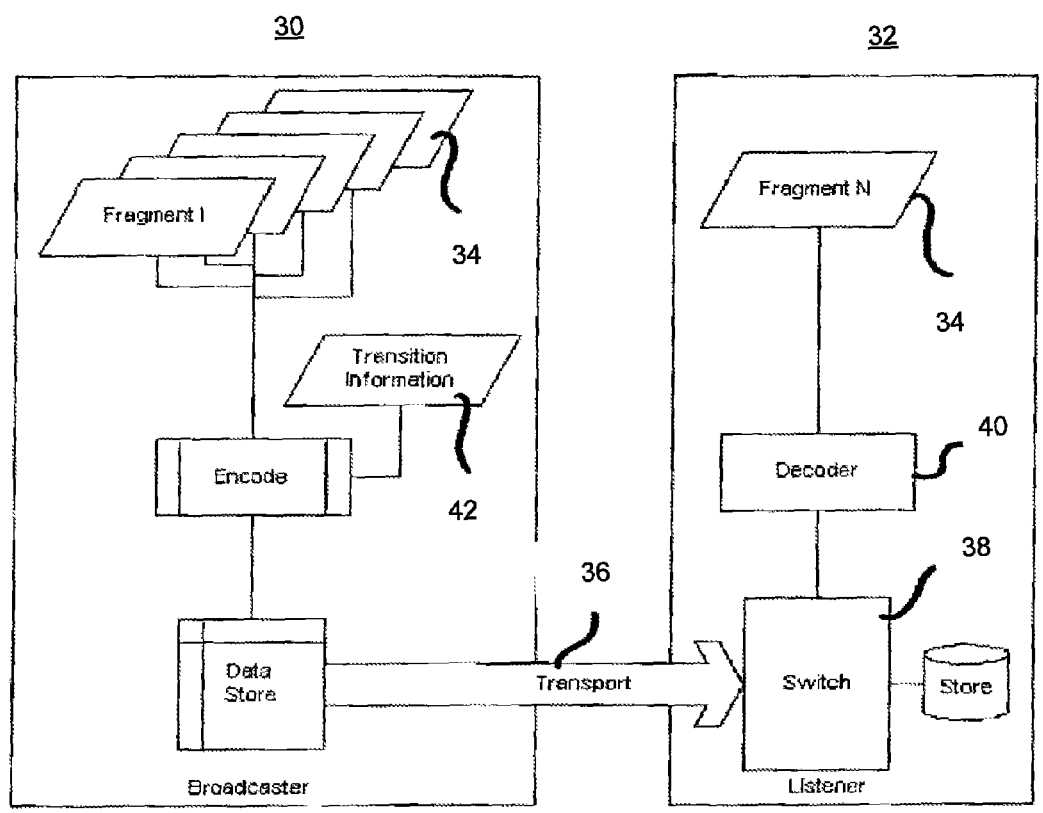
Fig. 2: Processing Model

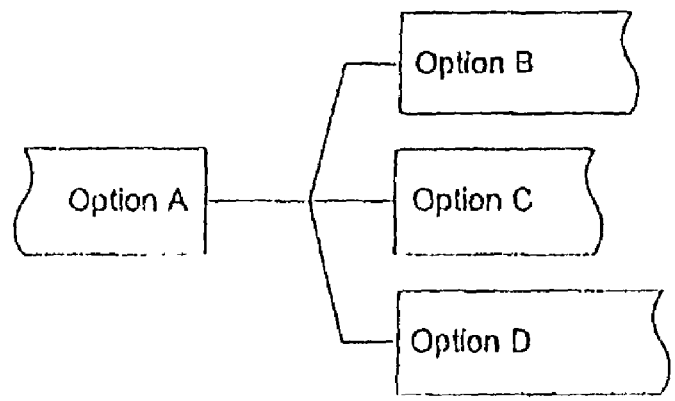
Fig. 3A: Branch (1 source option; N>1 target options)
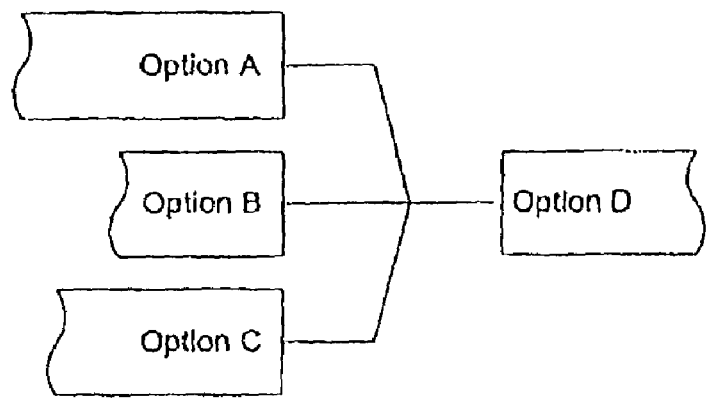
Fig. 3B: Confluence (M>1 source options; 1 target option)

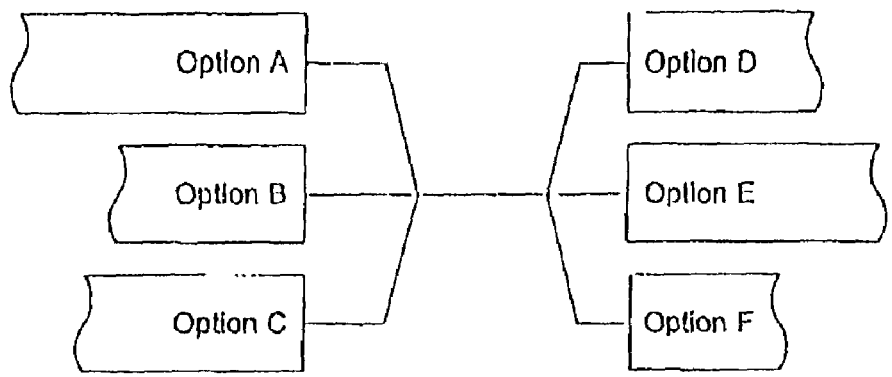
Fig. 3C: Junction (M>1 source options; N>1 target options)
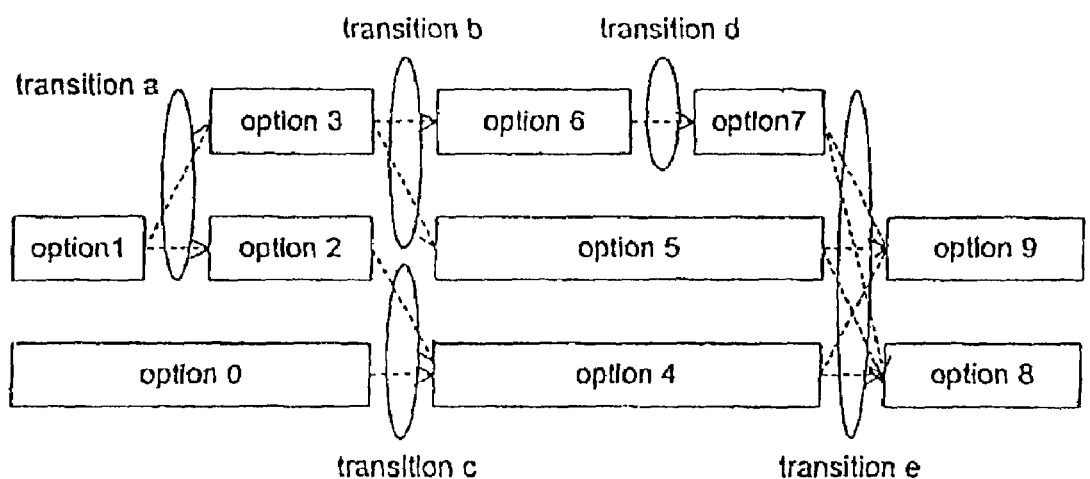
Fig. 3D: Personalized message with 5 transitions

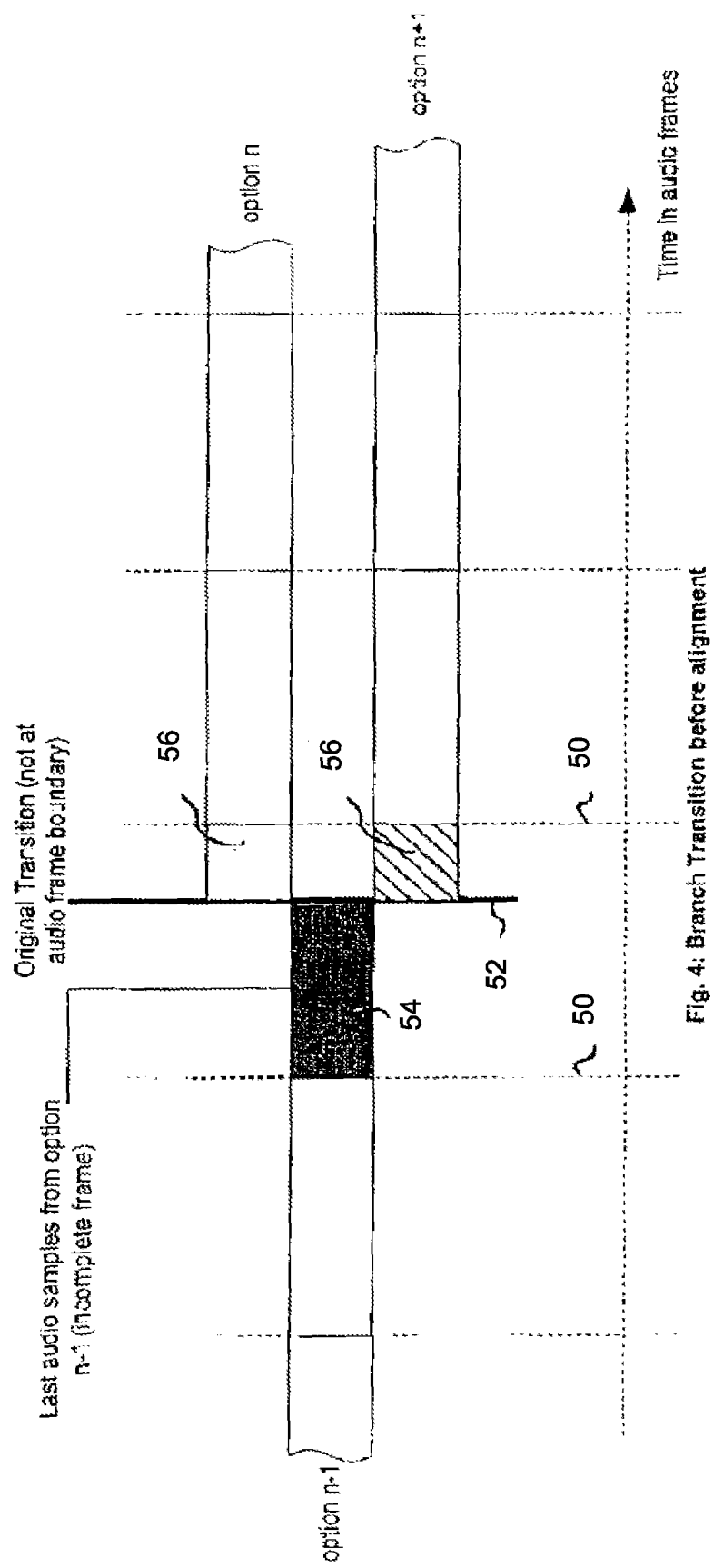

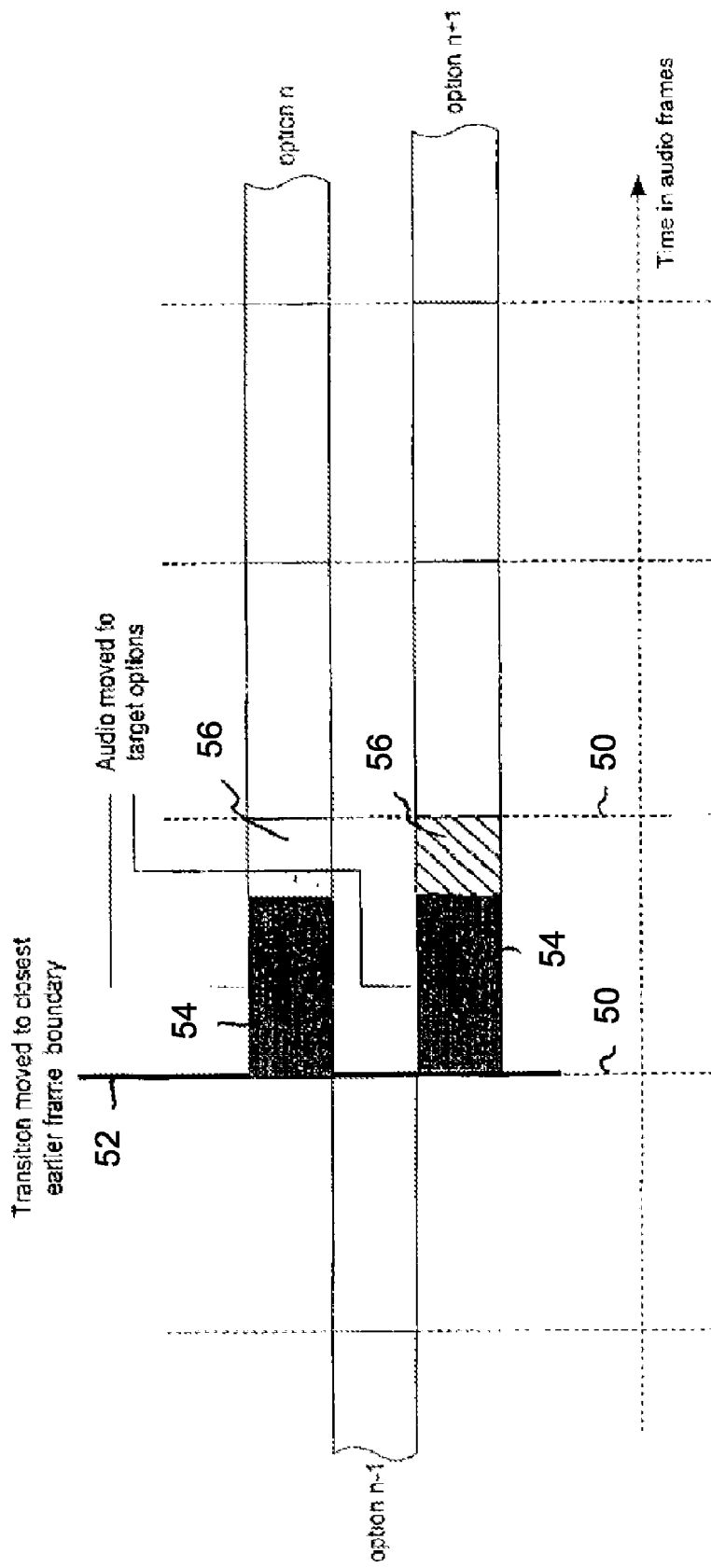

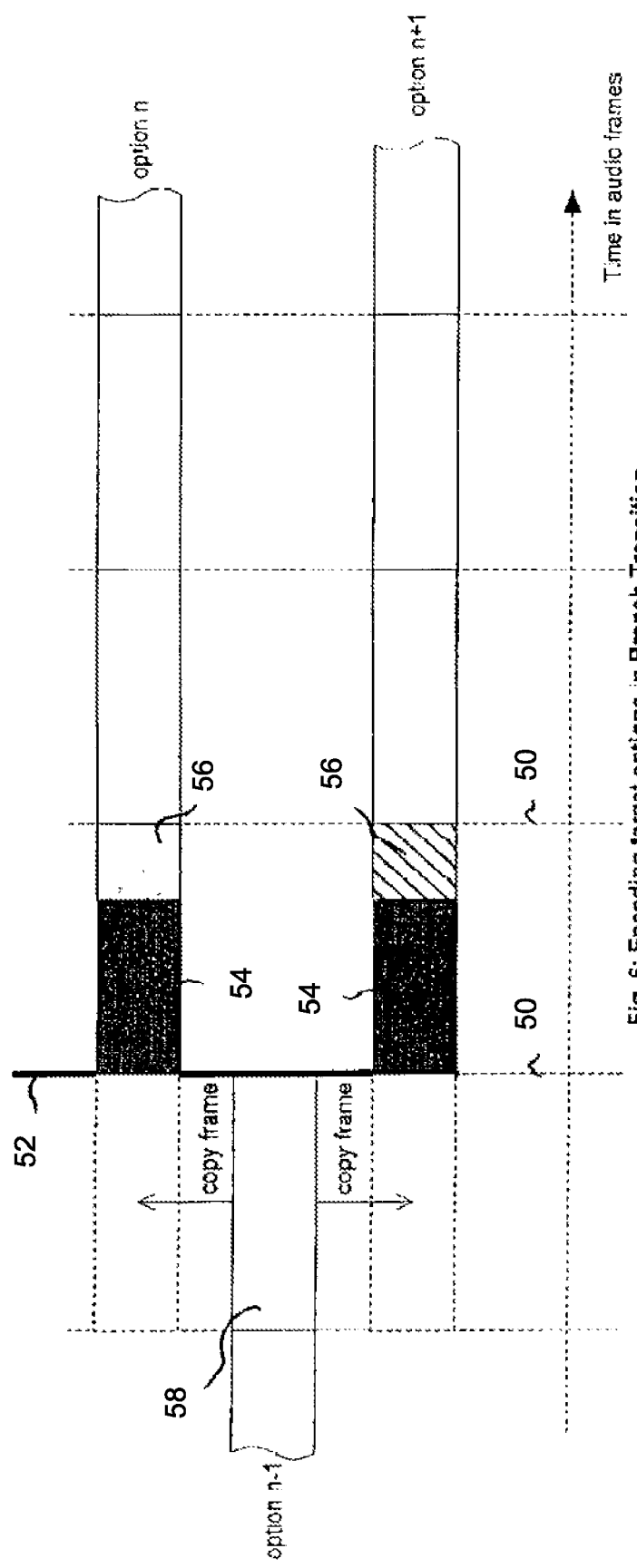
Fig. 6: Encoding target options in Branch Transition

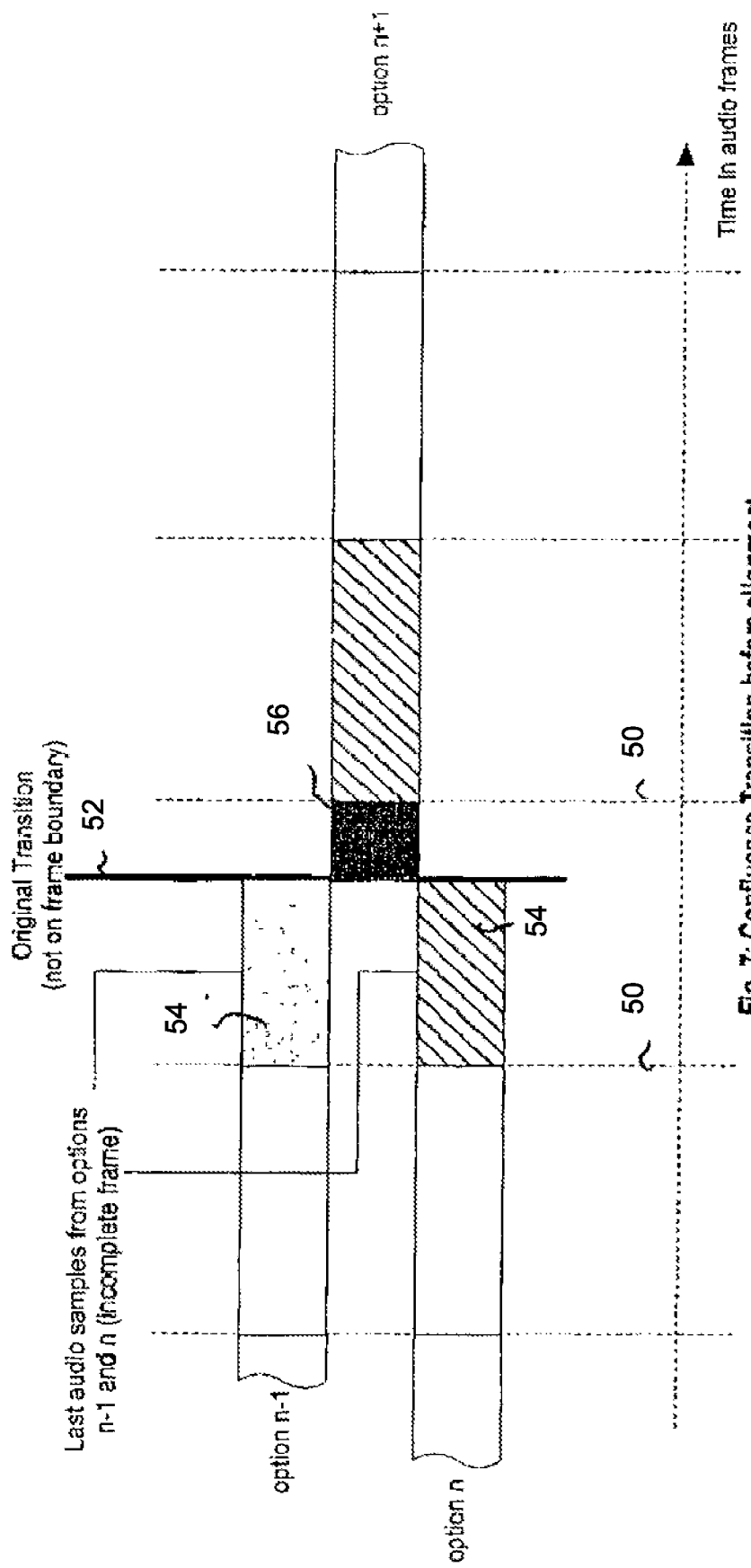

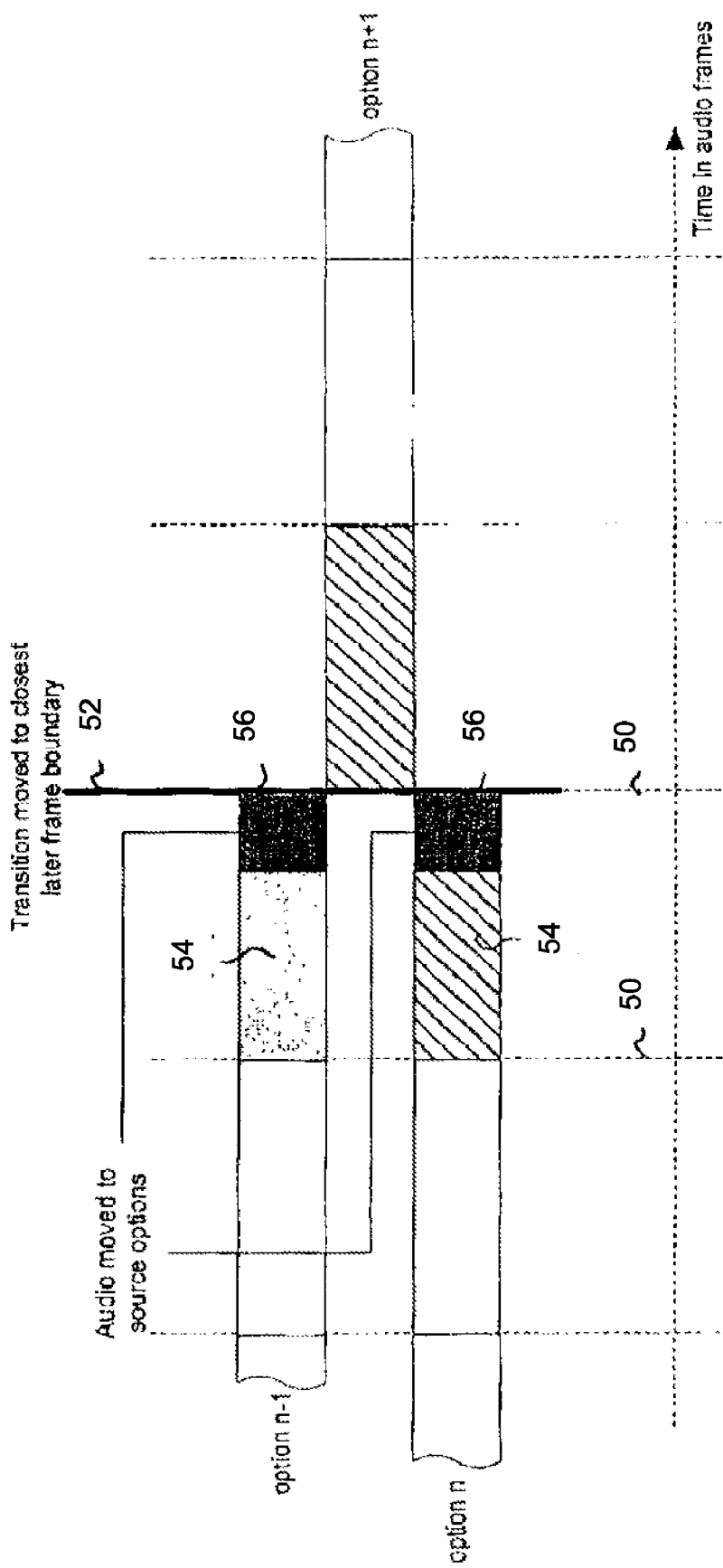
Fig. 8: Confluence Transition after alignment (step 1)

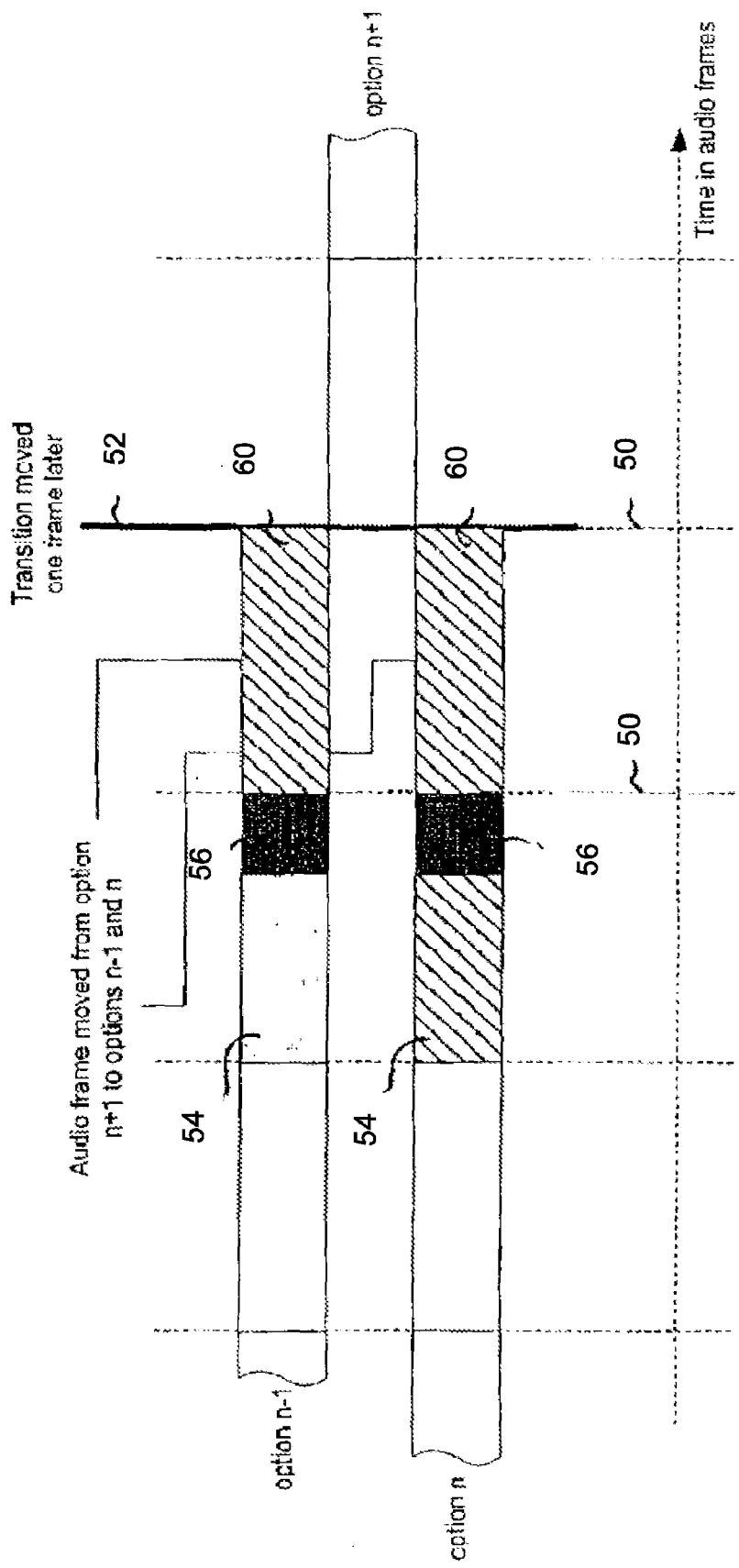

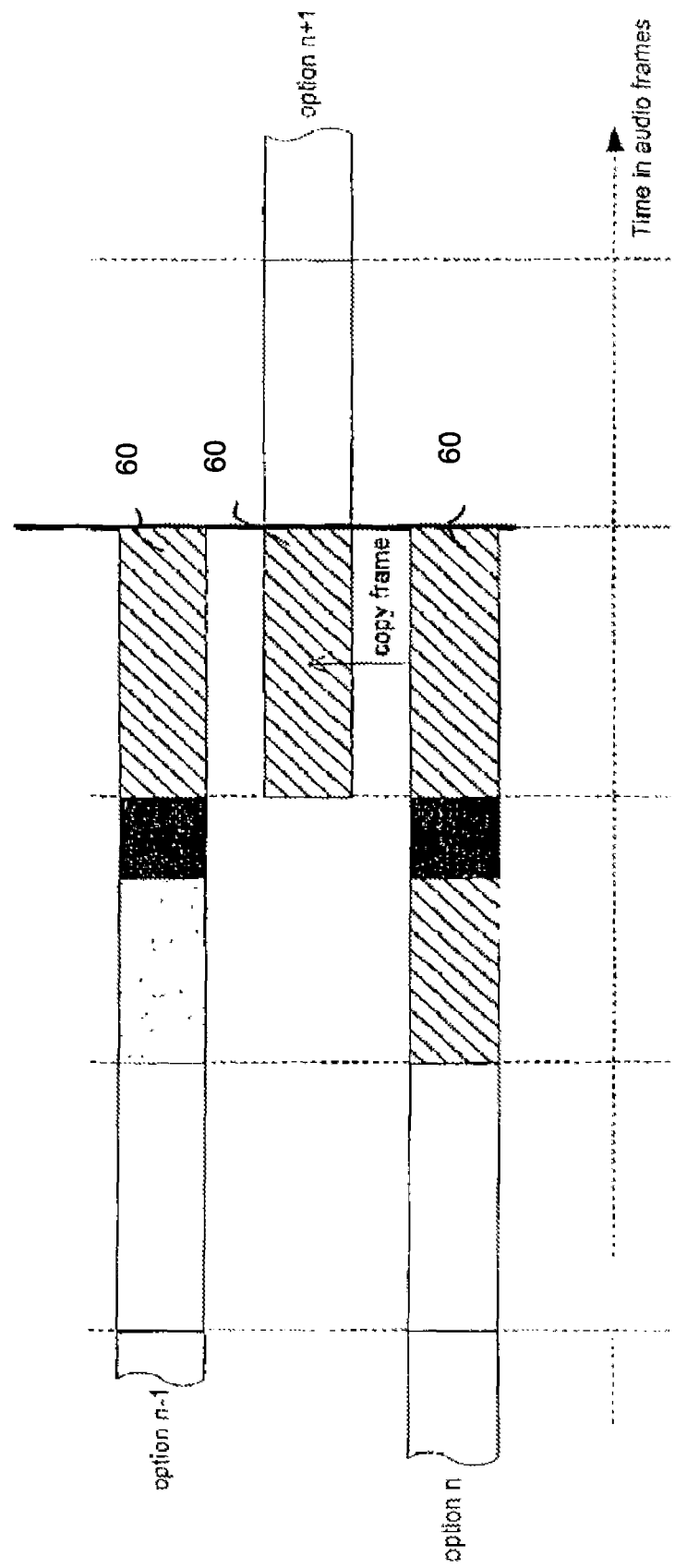
Fig. 10: Encoding target options in Confluence transition

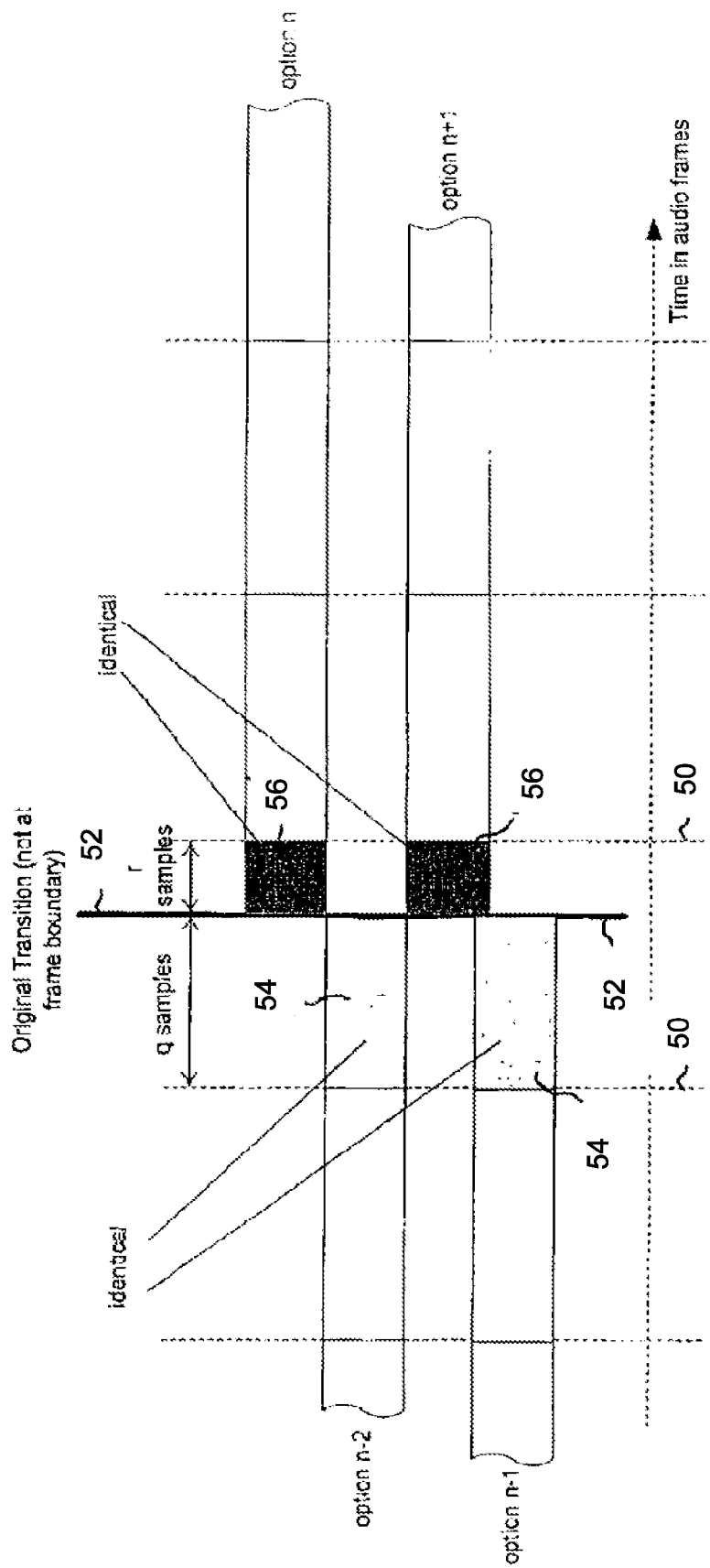

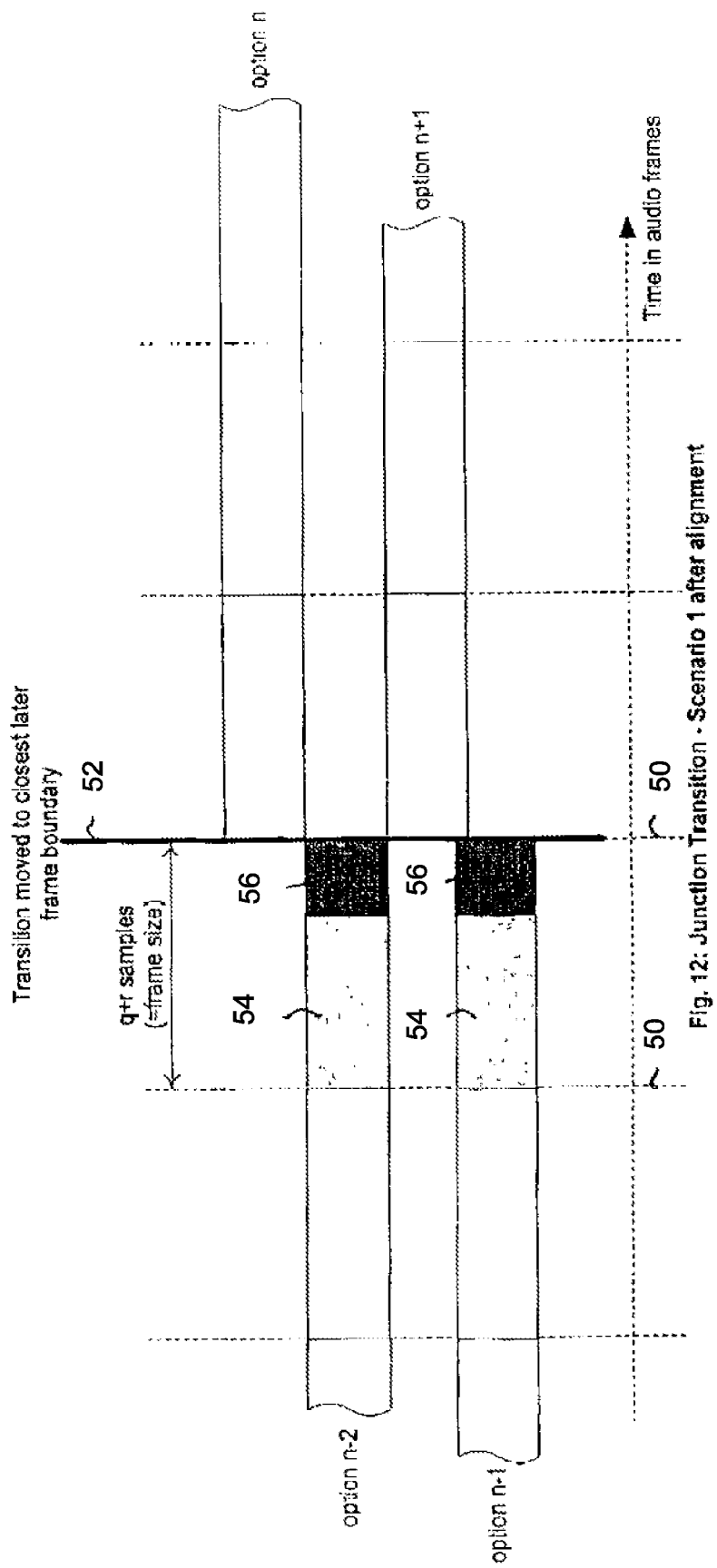
Fig. 12: Junction Transition - Scenario 1 after alignment

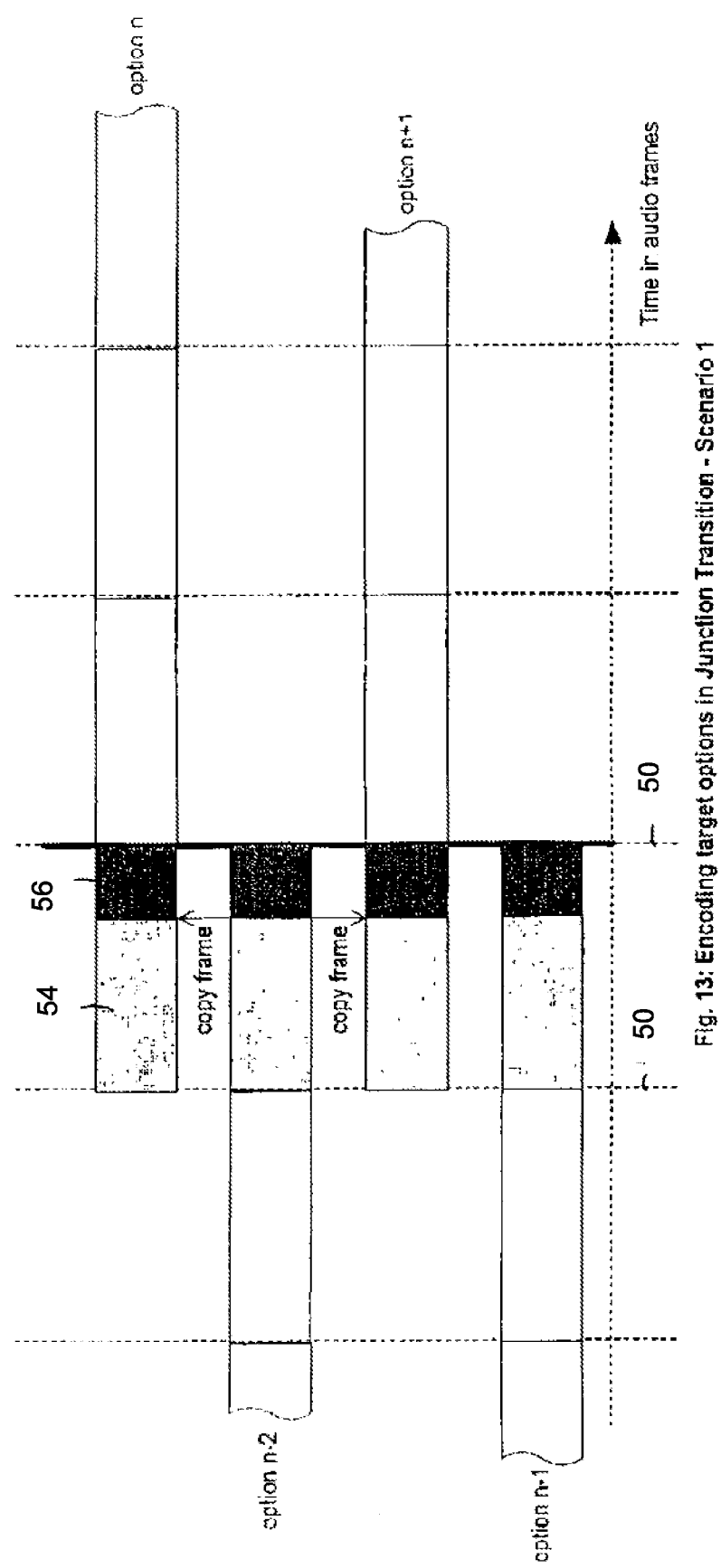
Fig. 13: Encoding target options in Junction Transition - Scenario 1

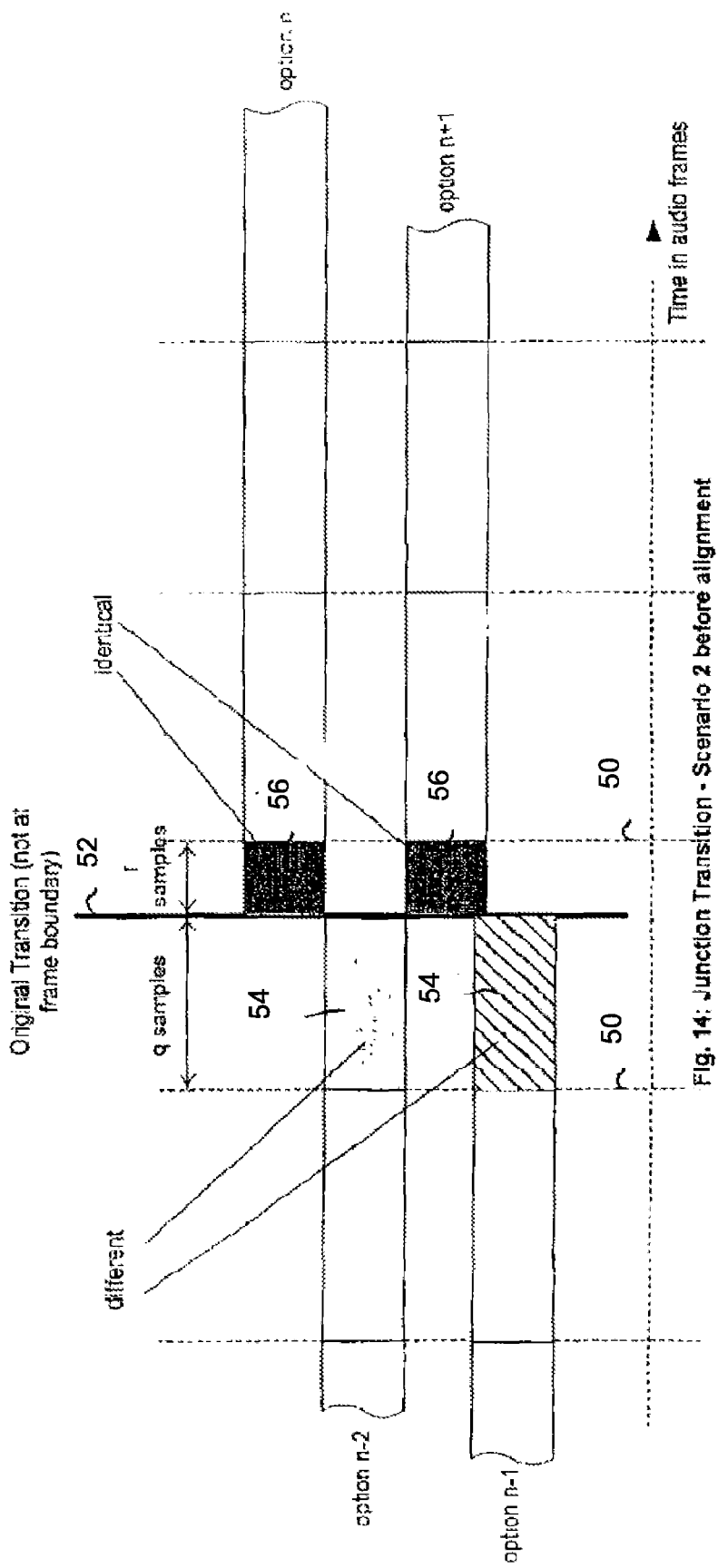
Fig. 14: Junction Transition - Scenario 2 before alignment

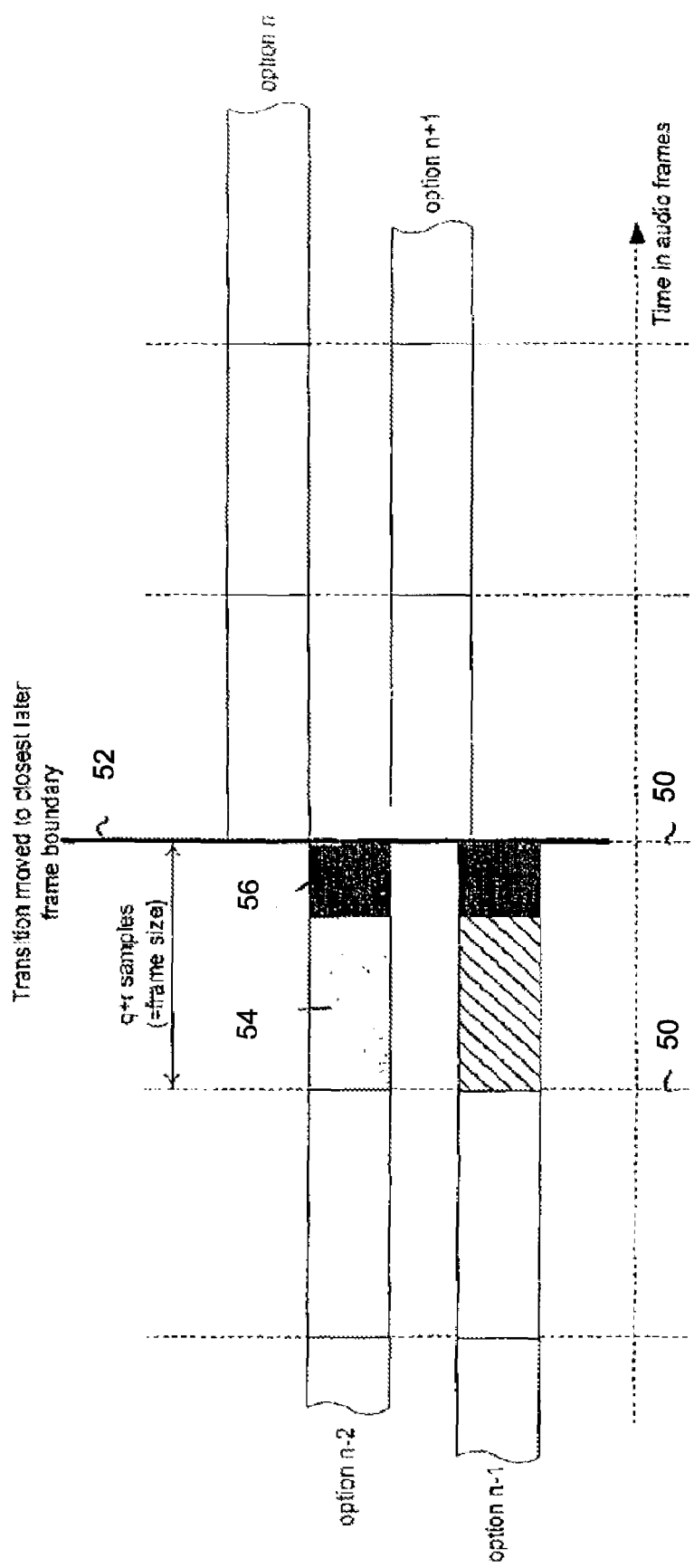

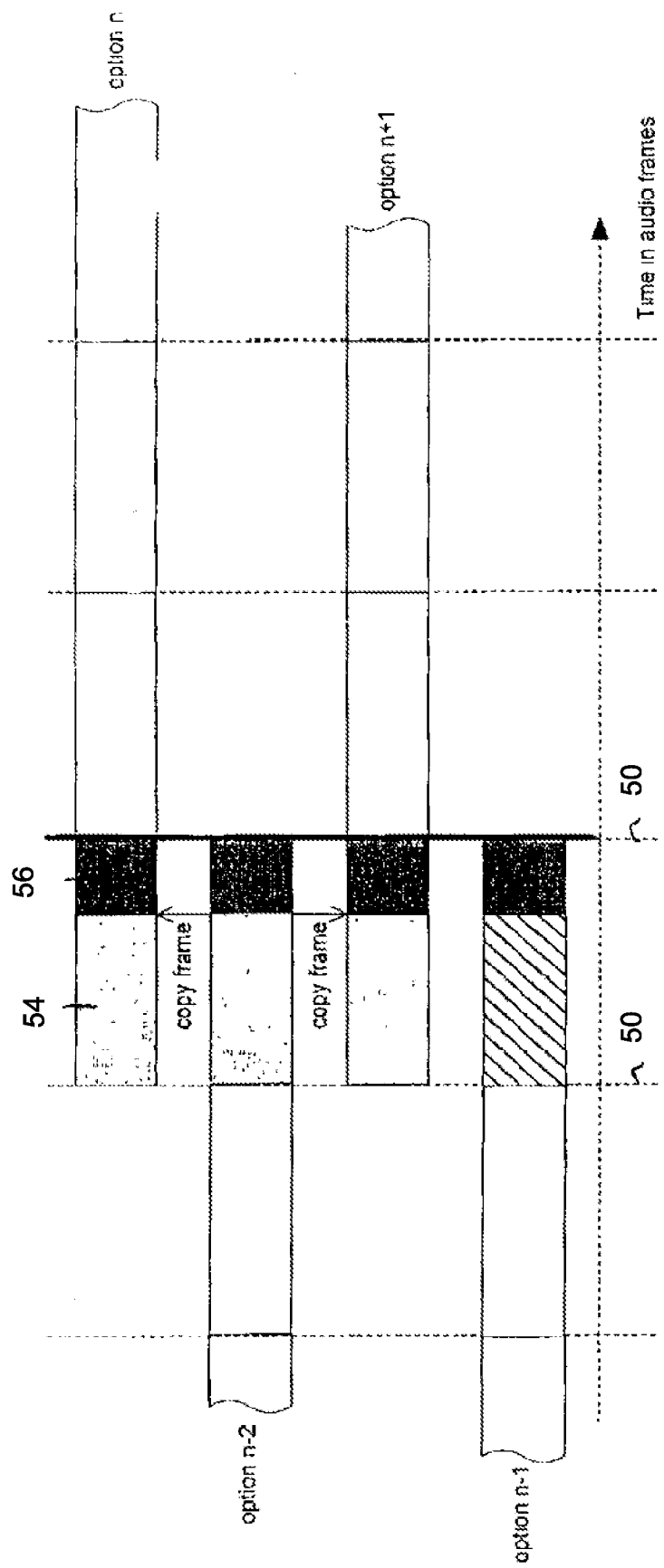
Fig. 16: Encoding target options in Junction Transition - Scenario 2

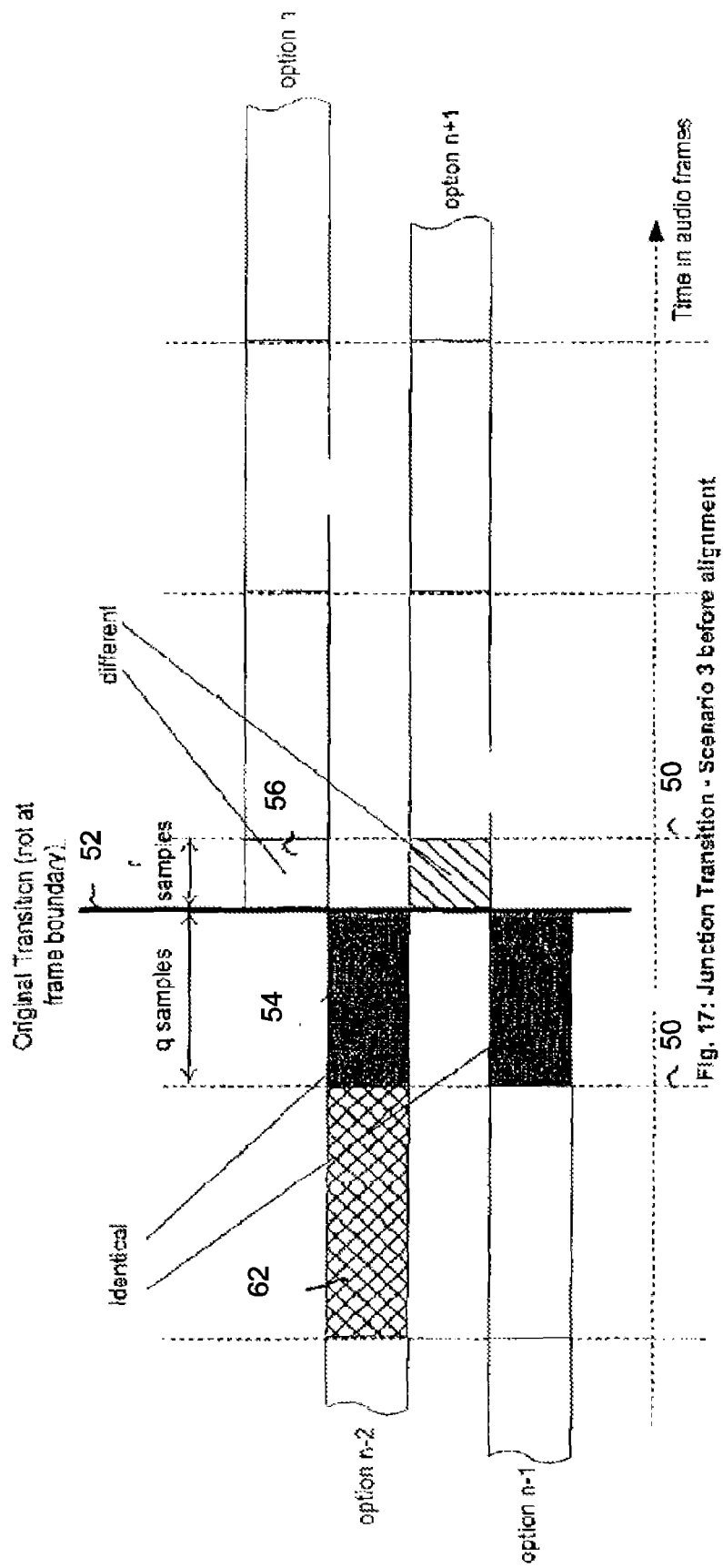
Fig. 17: Junction Transition - Scenario 3 before alignment

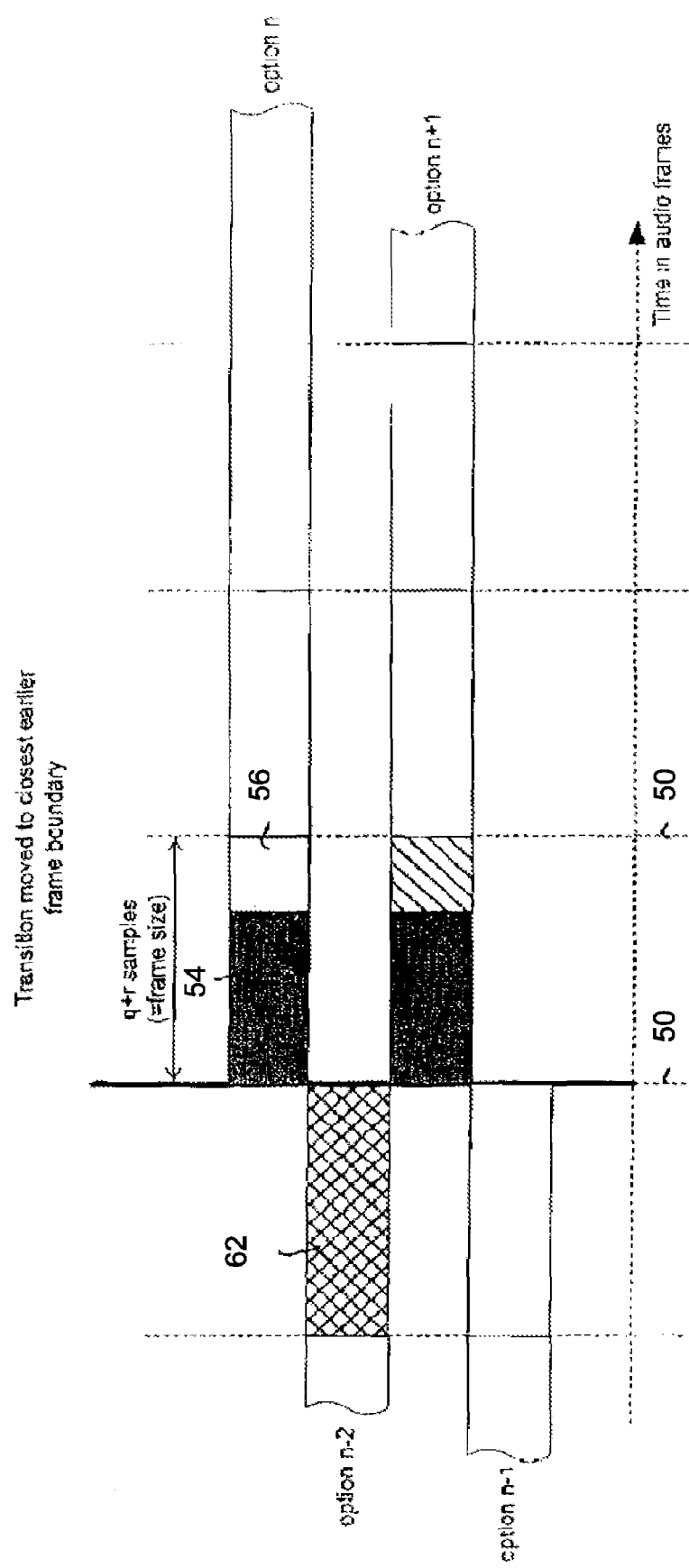
Fig. 18: Junction Transition - Scenario 3 after alignment

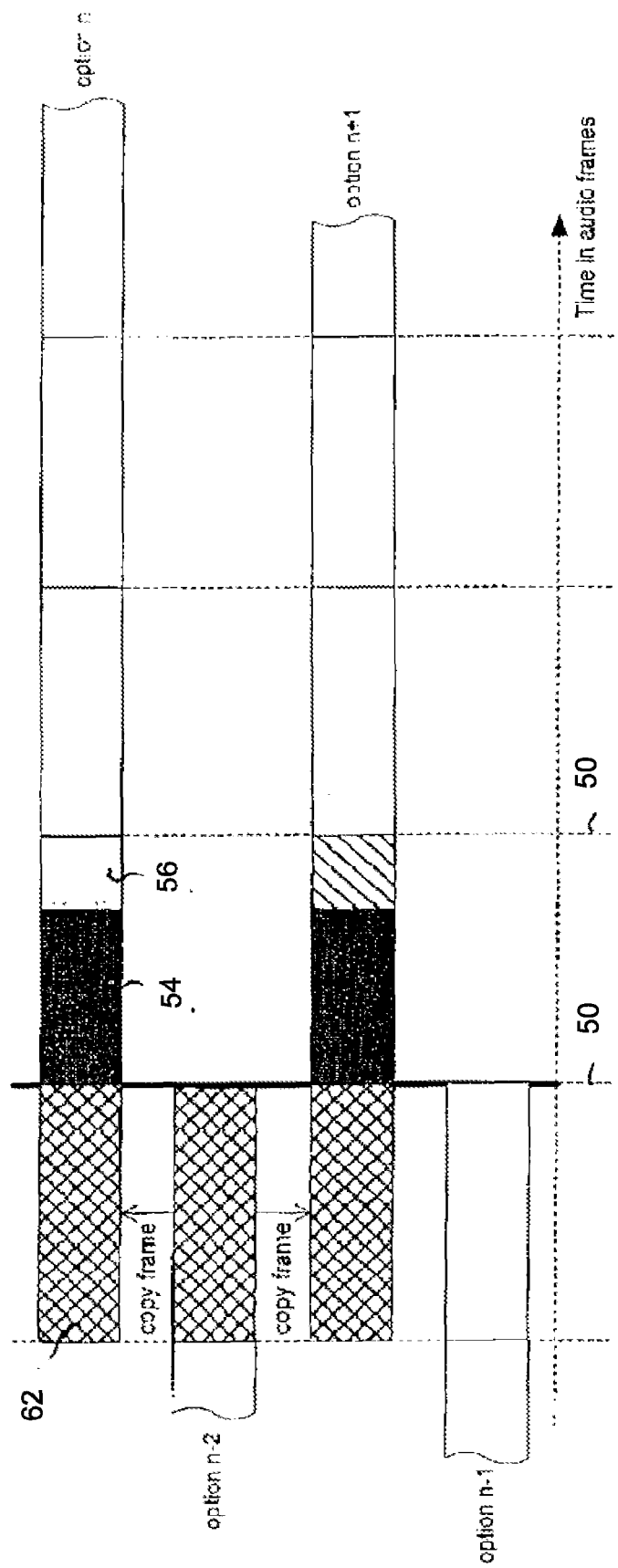
Fig. 19: Encoding target options in Junction Transition - Scenario 3

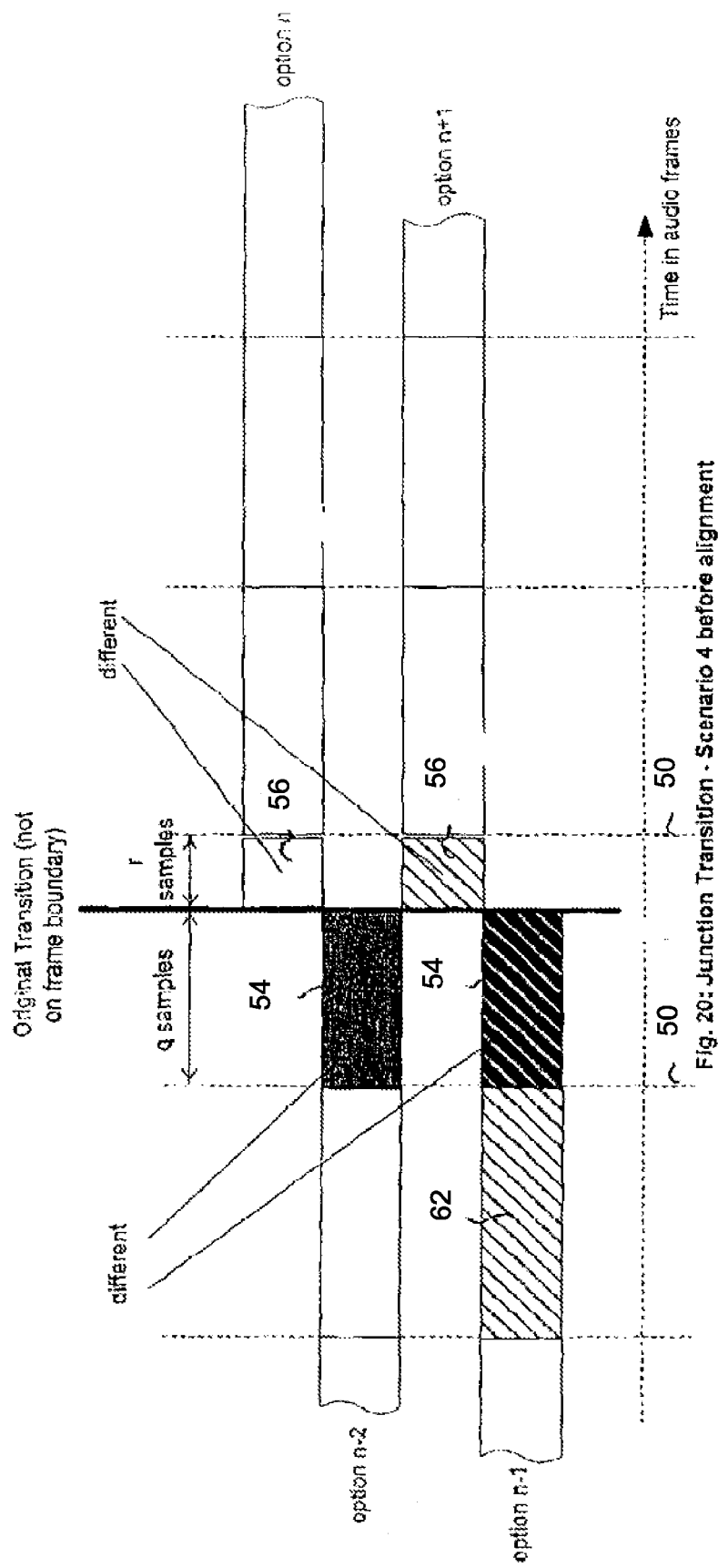

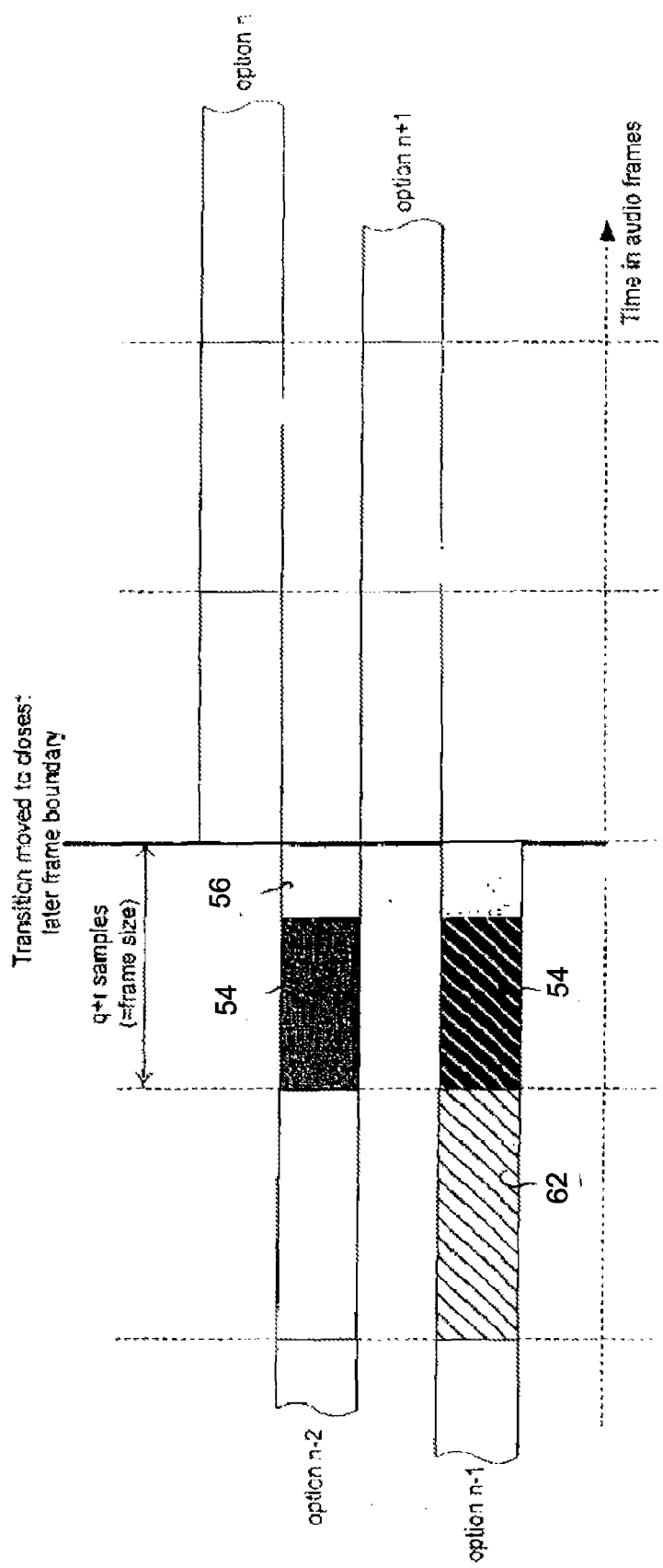
Fig. 21: Junction Transition - Scenario 4 after aligning (move later)

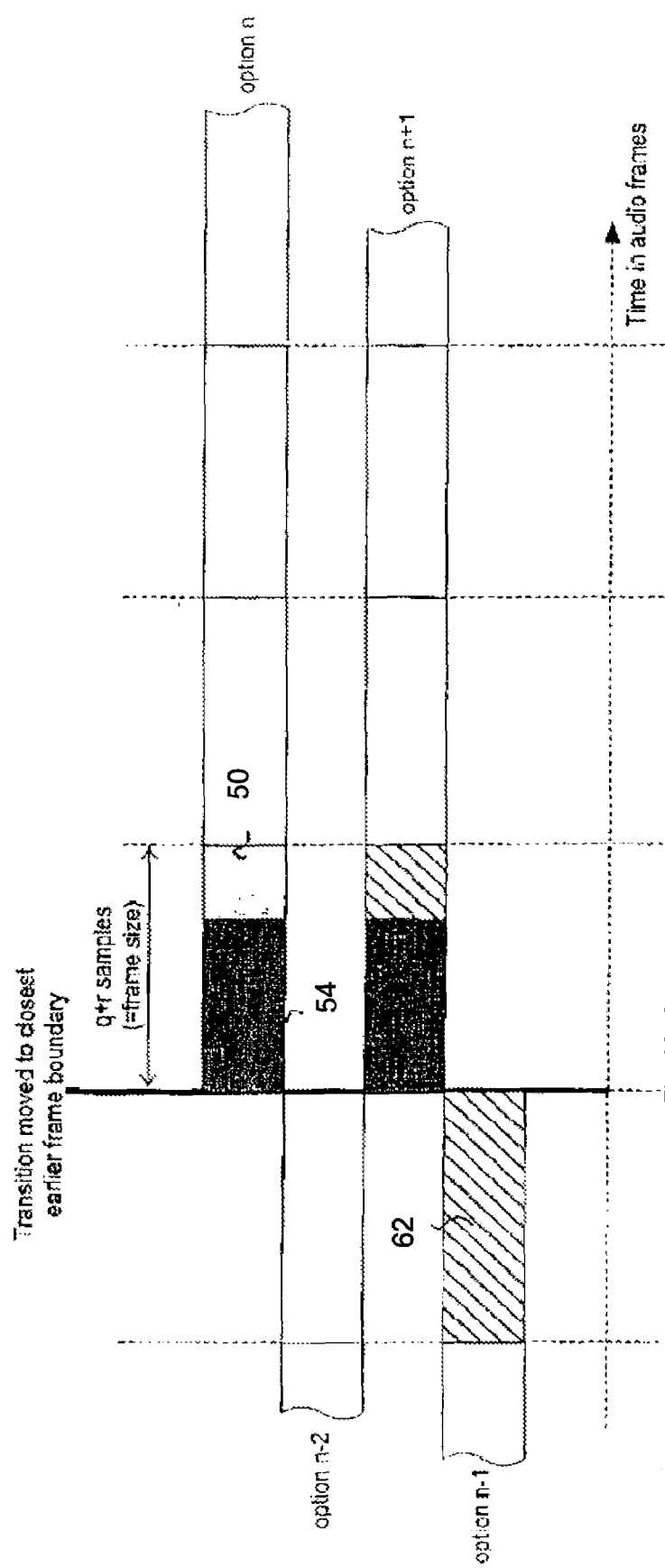

SYSTEM AND METHOD FOR SEAMLESS SWITCHING OF COMPRESSED AUDIO STREAMS

RELATED APPLICATION

This patent application claims priority to U.S. Provisional Application Ser. No. 60/303,846 filed Jul. 9, 2001 which is hereby incorporated by reference.

FIELD OF THE INVENTION

This invention is directed towards digital audio, and more particularly towards a method for preparation and compression of individual audio fragments that allows for seamless playback of sequences of such fragments.

BACKGROUND

Co-owned U.S. patent application Ser. No. 09/545,015 (which is incorporated herein by reference) describes a system and method for creating personalized messages (such as personalized advertisements and personalizes news). An example of a personalized message structure 20 is shown in FIG. 1. It starts with a common opening 22, followed by three possible options for the middle part 24 and a common closing 26. One instance of this message is given by the sequence opening then option 1 then closing; another instance is given by opening then option 2 then closing.

A personalized audio message structure as depicted in FIG. 1, is typically created by an audio designer using dedicated tools. The audio fragments in the message structure are typically generated by the audio designer using editing tools such as, but not limited to, AVID MediaComposer, ProTools, etc.

Having the personalized message structure as well as the associated audio fragments available, a switching device can create an instance of the personalized message by playing the proper fragments in sequence.

The personalized message structure and the associated audio fragments can be made available to the switching device in a variety of ways.

In one specific scenario, the audio fragments part of the personalized message will be broadcast in compressed form in different digital television channels and assembled by a switching device, such as a digital set-top-box, at the listeners location to form one specific instance of the message. One way in which the instance can be assembled is by switching channels on-the-fly at the moment a transition from one fragment to another must be made.

In another specific scenario, the media fragments will be made available to a switching device with storage (e.g., a DVD player, a PC) using a storage medium, such as a CD-ROM or a DVD disk. The fragments will be stored on this storage medium in compressed form. The switching device will select and load the proper fragments from the storage medium, and play them in sequence.

However, current compression technology applied in digital radio, digital TV, Internet and storage applications, including MPEG and AC-3 encoding and compression, does not readily allow for seamless concatenation or switching of compressed audio fragments, which poses a major problem.

One reason for this problem is that most audio codecs used in the domains of digital television, DVD, Internet streaming, and others operate on frames (fixed size groups) of samples, instead of individual samples. One frame, which is a number of consecutive audio samples, is encoded and decoded as a unit and cannot be broken into smaller subunits. Consequently, once the material is encoded, a transition or switch between options can occur only on frame boundaries. As typically used in the digital television domain, a codec for MPEG Layer II has a frame length of 1152 samples. A codec for Dolby AC-3 has a frame length of 1536 samples. If the length of a fragment (in samples) to be compressed is not an exact multiple of the frame size (in samples), the remainder of the fragment will either be thrown away during encoding, leading to loss of data and severe glitches, or it will be padded with zeroes, leading to pauses in the presentation. Obviously both are disadvantageous as they lead to a non-seamless presentation when concatenating and playing audio options after decoding.

Another reason for the problem is that most audio codecs used in the domains of digital television, DVD, Internet streaming, and others, encode audio frames based on the contents of previous frames.

In a filter-bank based codec, such as MPEG layer II, the outcome of the encoding process of a current audio frame depends on the filter bank states produced by the past frames. The filter bank acts like a memory. More specifically, MPEG Layer II uses a 32-band filter bank to decompose the incoming signal into sub band samples, which are then quantized. Alias cancellation affects neighboring sub bands, but not successive frames, so it does not pose a problem for the switching. However the states of the filter bank in the encoder and in the decoder depend on the previously encoded frame. To achieve perfect reconstruction after the decoder filter bank, the filter states must be the same as in the encoding process.

In a transform-based codec, such as AC-3, the window and overlap-add mechanism introduces a dependency between successive frames. Here the overlap-add requires consecutive frames to be encoded and decoded in the right context to ensure that alias components cancel out in time. More specifically, AC-3 uses a windowing of the input data, a DCT and subsequent IDCT and overlap-add in the decoder. Successive windows overlap. Alias cancellation is in the time domain and requires the proper history to work. If arbitrary AC-3 streams are concatenated, the alias cancellation does not work at the splice point. This leads to audible artifacts, which are theoretically much worse than in the MPEG case. At the start of an encode process of several frames a start window is used which effectively mutes the first 256 samples of the first frame. This creates a clearly audible gap, which is not acceptable for concatenation. The last frame of a decoded sequence ends with a fade out of the signal over the final 256 samples; due to the missing overlap add of the next frame.

The fact that most audio codecs use a history means that fragments that are intended to be played back in sequence cannot be encoded in isolation, even if their lengths are exact multiples of the frame size defined by the compression scheme. If no additional measures are taken, the transition from one fragment to another will not be seamless, and lead to audible artifacts.

Accordingly, what is required is a method and system for manipulating and encoding/compressing audio fragments such that a switching device can decode and play such compressed fragments in sequence without audible gaps or artifacts. The present invention discloses such a method and system.

SUMMARY

The technology described in the present application addresses the issues around seamless playback of sequences of separately encoded and compressed, digital audio fragments.

The present invention provides for a method and system for manipulating audio fragments and subsequently encoding/compressing such audio fragments in a manner that allows for seamless playback at a switching device, thus providing a seamless, uninterrupted, presentation to the listener.

The manipulation of the audio fragments according to the present invention comprises aligning beginning and end times of audio options in a personalized message on frame boundaries, where the frame size is defined by the compression scheme to be used (e.g., 1152 for MPEG Layer II and 1536 for AC-3).

The encoding of the audio fragments according to the present invention takes history into account for example by prepending one additional audio frame at the start of an fragment to set the history of the encoder. This frame is subsequently discarded from the compressed result since it is only used to initialize the history of the encoder. The audio frame to be prepended is obtained from the end of one of the options that can directly precede the fragment to be encoded.

An illustrative embodiment of the present invention is used to process and encode the audio fragment, also called options, in a personalized message (which can be an advertisement, a news program, . . . ). This allows a receiver, such a digital set-top box, to seamlessly, and on-the-fly, assemble and play out one instance of the message while the various message options are provided to the set-top-box using an MPEG-2 transport stream.

An advantage of the present invention is the ability to manipulate and encode audio fragments belonging to a personalized message structure such that playout of instances of the message will be seamless, i.e., without audible artifacts, at all points of the message, including around the transition points between audio fragments.

Another advantage of the present invention includes the preparation of an personalized message for efficient transport and distribution over digital television channels, DVDs, and other distribution means.

An illustrative embodiment of the present invention includes a method of preparing a plurality of digital audio fragments to allow switching between at least one source fragment and at least one target fragment. The method includes aligning an end of at least one source fragment with a beginning of at least one target fragment, for all possible valid combinations of at least one source fragment and at least one target fragment; wherein the at least one source fragment is aligned to be a length that is an exact multiple of a predetermined number. The method also includes moving a sequence of audio samples from a digital audio fragment which was shortened because of the alignment step, to a plurality of digital audio fragments which were lengthened because of the alignment step. The moved sequence of audio samples is a length which will result in at least one source fragment to be a length that is an exact multiple of the predetermined number. Typically, the predetermined number is a frame size.

The illustrative embodiment also includes moving a sequence of audio samples from the end of at least one source fragment to the beginning of at least one target fragment; wherein the sequence of audio samples is a length which will shorten the one source fragment to be a length that is an exact multiple of the predetermined number.

The present invention also includes copying a last frame of a source fragment to the beginning of at least one target fragment, compressing the at least one target fragment using a compression scheme which uses frames and wherein subsequent frame encoding depends upon an encoding of at least one previous frame. The method includes removing data from the beginning of the compressed at least one target fragment, the data corresponding to a first frame of the at least one target fragment.

An embodiment of the present invention includes a system for preparing a plurality of digital audio fragments for transmission to allow a switching device to switch between at least one source fragment and at least one target fragment. The system includes an audio aligner module, coupled to a source of the plurality of audio fragments, to align beginning and ends of the plurality of audio fragments to selected times based on an exact multiple of a predetermined number; and an audio compression module, coupled to the audio aligner module, to compress the plurality of audio fragments as a sequence of frames, wherein each frame comprises a sequence of audio samples; and the length of the frame is the predetermined number. The system works for audio fragments that are transmitted using any one of several transport mechanisms, including MPEG compliant, digital television, dvd broadcast, dvd storage, CD ROM, and internet.

BRIEF DESCRIPTION OF THE DRAWINGS

The foregoing and other features and advantages of the present invention will be more fully understood from the following detailed description of illustrative embodiments, taken in conjunction with the accompanying drawings in which:

FIG. 1 illustrates an example of a (simple) personalized message structure;

FIG. 2 illustrates a processing model for personalized messages;

FIGS. 3A-3C illustrate the three possible situations for transitions between options in a personalized message (branch, confluence, and junction);

FIG. 3D illustrates an example of a more complex personalized message structure, containing various types of transitions;

FIG. 4 illustrates an example branch situation with the transition point not aligned on a frame boundary;

FIG. 5 illustrates the transition of FIG. 4 moved to an earlier frame boundary in accordance with the present invention;

FIG. 6 illustrates providing a temporary copy of the last frame of the source option for encoding target options in the transition of FIG. 5 in accordance with the present invention;

FIG. 7 illustrates an example confluence situation with the transition point not aligned on a frame boundary;

FIG. 8 illustrates the transition of FIG. 7 moved to a later frame boundary in accordance with the present invention;

FIG. 9 illustrates the transition of FIG. 8 moved one frame later to realize identical endings of all source options, in accordance with the present invention;

FIG. 10 illustrates providing a temporary copy of the last frame of one of the source options for encoding target options in the transition of FIG. 9 in accordance with the present invention;

FIG. 11 illustrates an example case of a junction where the transition is not located on a frame boundary, and where the ending of all source options is identical, and where the beginning of all target options is identical;

FIG. 12 illustrates the transitions of FIG. 11 moved to a later frame boundary in accordance with the present invention;

FIG. 13 illustrates providing a temporary copy of the last frame of any source option for encoding target options in the transition of FIG. 12 in accordance with the present invention;

FIG. 14 illustrates an example case of a junction where the transition is not located on a frame boundary, and where the ending of all source options is different, and where the beginning of all target options is identical;

FIG. 15 illustrates the transition of FIG. 14 moved to a later frame boundary in accordance with the present invention;

FIG. 16 illustrates providing a temporary copy of the last frame of any source option for encoding target options in the transition of FIG. 15 in accordance with the present invention;

FIG. 17 illustrates an example case of a junction where the transition is not located on a frame boundary, and where the ending of all source options is identical, and where the beginning of all target options is different;

FIG. 18 illustrates the transition of FIG. 17 moved to an earlier frame boundary in accordance with the present invention;

FIG. 19 illustrates providing a temporary copy of the last frame of any source option for encoding target options in the transition of FIG. 18 in accordance with the present invention;

FIG. 20 illustrates an example case of a junction where the transition is not located on a frame boundary, and where the ending of all source options is different, and where the beginning of all target options is different;

FIG. 21 illustrates the transition of FIG. 20 moved to a later frame boundary in accordance with the present invention; and FIG. 22 illustrates the transition of FIG. 20 moved to an earlier frame boundary in accordance with the present invention.

DETAILED DESCRIPTION

A processing model capable of supporting seamless switching/concatenation of compressed audio fragments in accordance with the present invention is shown in FIG. 2. At the source 30 the audio fragments 34 are encoded and prepared for transport. At the listener location 32 the fragments are received, and a subset of them is decoded and played out in sequence. The fragments 34 are individually encoded with the structure of the possible transitions in the personalized message 42 taken into account, and are optionally stored. The compressed fragments 34 are transported via a channels 36 to the listener 32. This transport may occur in real-time (as in TV broadcasts) or in non real-time (as in storage media such as DVD). The fragments are optionally stored at the listener location 32 before decoding and playout.

The compressed files to be decoded and played are selected by a switch 38, and provided to the decoder 40 in sequence. The decoder 40 decompresses the resulting bit stream and presents the audio to the listener.

The different scenarios for transitions in a personalized message are Branches FIG. 3A, Confluences FIG. 3B, and Junctions FIG. 3C. Branches consists of one option (source) transitioning to a plurality of options (targets). Confluence consists of multiple options (sources) transitioning to one subsequent option (target). A junction consists of multiple options (sources) transitioning to subsequent multiple options (targets). It is important to note that the options at the two sides of the branch do not need to have identical lengths. The only requirement on the transition is that the source options end at the exact same time, and that the target options begin at the exact same time. This is further illustrated in FIG. 3D, which shows an example of a personalized message structure with 10 options and 5 transitions. Arrows in the Figure denote which options can be played in sequence as identified by the creator of the personalized message. It is interesting to note that there is a 1 to 1 transition in the example. This can either be treated as a branch or a junction. Furthermore it is interesting to note that the transitions are defined based on the information from the creator which options can be played in sequence. This leads, for instance to two different transitions between options 0,2,3 and 4,5,6, i.e., a branch from 3 to 5,6 and a confluence from 0,2 to 4.

The individual steps that need to be taken from the original (uncompressed) options and message structure to the final encoded (compressed) options and message structure will now be provided. Several of the disclosed steps might be combined into one physical step, or certain steps might be split-up into smaller physical steps, but the focus here is on the conceptual steps rather than those implemented as separate entities. Also, no assumptions are being made on where a conceptual step is executed by a human or a machine, since both are possible.

The first step in personalized messaging involves the creation of the uncompressed audio options and their possible transitions. The creation process as assumed in the present invention provides full flexibility to the creator of the personalized message with respect to the exact time of and type of possible transitions between options. It is understood that the creator could already perform some of the steps as described below in a manual fashion while creating the uncompressed audio options, but this is not required.

In order to avoid clicks and pops when playing sequences of uncompressed audio according to the personalized message structure, the audio on both sides of each transition must form smooth continuous waveforms. All allowed transitions must sound smooth in the uncompressed domain, otherwise the switch in the compressed domain cannot be done without at least the same audible artifacts. Hence, playback of the compressed options will only be seamless when playback of the uncompressed material is seamless.

The first constraint on a personalized message whose options have to be compressed is related to audio frames (also called 'Access Units' in MPEG). Most audio codecs used in the domains of digital television, DVD, Internet streaming, and others operate on frames of samples at any one time. One frame, which is a number of consecutive audio samples, is encoded and decoded as a unit and cannot be broken into smaller subunits. Consequently, once the material is encoded, a transition or switch between options can only occur only on frame boundaries. Frame lengths for codecs are usually defined as number of samples rather than duration, leading to different durations for different sample rates. As typically used in digital television, a codec for MPEG Layer II has a frame length of 1152 samples. A codec for Dolby AC-3 has a frame length of 1536 samples.

Thus, transitions in the personalized message structure as defined during creation need to be adjusted such that they occur on audio frame boundaries, rather than on arbitrary audio samples. The adjustment of transitions to frame boundaries (meaning that each option in the message has a length that is an exact multiple of the frame size of the coding scheme to be used) is required before the options themselves are actually encoded. This is needed to avoid playout artifacts, since encoders operate on a frame-by-frame basis. Parts of frames cannot be processed, and will either be thrown away, leading to loss of data and severe glitches, or they will be padded with zeroes, leading to pauses in the presentation.

Obviously both are unwanted as they lead to a non-seamless presentation when concatenating compressed audio options.

The present invention ensures that transitions are correctly moved to audio frame boundaries with as little as possible loss of information (audio data). For each of the three types of transitions a different scheme is disclosed that moves the transition to the closest earlier or later frame boundary.

The next constraint related to compression of options in personalized messages is history. Most audio codecs used in the domains of digital television, DVD, Internet streaming, and others, encode audio frames based on the contents of previous frames. In a filter-bank based codec, such as MPEG layer II, the outcome of the encoding process of a current audio frame depends on the filter bank states produced by the past frames. The filter bank acts like a memory. In a transform-based codec, such as AC-3, the window and overlap-add mechanism introduces a dependency between successive frames. Here the overlap-add requires consecutive frames to be encoded and decoded in the right context to ensure that alias components cancel out in time.

The present invention ensures that the history of the encoders and decoders is maintained correctly across transitions. Common to all transitions is that typically one additional audio frame from a preceding option is encoded at the start of an option to set the history of the encoder. This frame is discarded after the encoding is done, resulting in the compressed version of the option. This will be disclosed further below.

Thus, processing the options in a personalized message after creation in accordance with the present invention can be split in two consecutive steps: Alignment and Encoding. Each of these steps is disclosed below.

Alignment

The first step, alignment, will ensure that all options in the personalized message have a length that is an exact multiple of the frame length of the intended compression scheme. This allows encoding of options without the encoder having to either discard data or introduce silence. Thus, during alignment, transitions between options are moved to frame boundaries.

The second main function of alignment is ensuring that all source options in each transition have an as similar last frame as possible. The reason for this is that the last frame of one of these options will be used during encoding of the target options in the transition to initialize the encoder history buffer, as disclosed below in the section on encoding. Since only one source option can provide the frame to be used to fill the encoder buffer, transitions from source options to target options will only be perfectly seamless when the last frames of all source options in a transition are identical.

Alignment of the complete personalized message is done one single transition at a time. A transition can be handled the easiest when the source options of that transitions start at a frame boundary, otherwise the transition might have to be revisited/reprocessed later on in the process. This means that transitions are handled preferably in a time-increasing fashion, meaning that later transitions are handled after earlier transitions. This way, it is assured that, when handling one transition, all source options in that transition always start on a frame boundary.

Any person skilled in the art can see that different methods/orders of aligning a template are also possible. The one just described is one example that is particularly easy to implement in specific embodiments of this invention.

In the following section is described how one individual transition will be handled, assuming all transitions that happen before it in time in the message structure have already been handled as described below. We disclose the handling of each of the three different types of transitions separately:

Branch (1 to M transitions)
Confluence (N to 1 transitions)
Junction (N to M transitions)

Branch

For branching, the transition point is moved to the closest earlier frame boundary. This is required because a move to the closest later frame boundary would lose audio samples from all target options but one. The audio samples from the source option that are between the new and the old transition point are appended to the beginning of each target option. As illustration, FIG. 4 shows the original situation for two target options. The original transition 52 as set by the creator of the personalized message is shown. It does not lie on a frame boundary 50. As a result, assuming that option n−1 starts on a frame boundary, the last samples 54 of option n−1 do not add up to a complete frame length.

In FIG. 5 the transition 52 is moved to the closest earlier frame boundary by removing the audio samples 54 of option n−1, and prepending them to the audio samples 56 of target options n and n+1. The exact same samples 54 are prepended to each of these two options. The transition 52 now occurs on an audio frame boundary 50, which makes it possible to switch seamlessly from option n−1 to option n or option n+1 after compression. Also, options n and n+1 now start on frame boundaries, allowing transitions in which they appear as source options to be treated as disclosed.

No further processing is needed for branching.

Confluence

For confluence, the transition point is moved to the closest later frame boundary. This is required because a move to the closest earlier frame boundary would lose audio samples from all source options but one. The audio samples from the target option that are between the old and the new transition point are appended to each source option.

As illustration, FIG. 7 shows the original situation for two source options. The original transition 52 as set by the creator of the personalized message is shown. It does not lie on a frame boundary 50. As a result of this, assuming that options n−1 and n start on frame boundaries (which can be different), the last samples of each of the options n−1 and n do not add up to a complete frame (they will be off by the same amount of samples since both start on a frame boundary).

In FIG. 8 the transition 52 is moved to the closest later frame boundary 50 by removing the audio samples 56 of option n+1, and appending them to the audio samples 54 of options n−1 and n. The same samples are appended to each of these two options. Transition 52 now occurs on an audio frame boundary, which makes it possible to switch seamlessly from option n−1 or option n to option n+1 after compression. Also, option n+1 now start on a frame boundary, allowing transitions in which it appears as source option to be treated as disclosed.

To allow encoding such that perfect seamless transitions between source and target options can be achieved an additional processing step is required for confluence. This step is to assure that the last frame of each source option is identical, required for optimal initialization of the history of the encoder buffer. Therefore, the first full audio frame in target option n+1 is removed from option n+1 and appended to options n−1 and n. This is illustrated in FIG. 9. The samples in the complete frame 60 as also shown in FIG. 8 have been moved from the target option to the end of each source option.

Junction

The case of a junction requires special attention, as previously discussed. For the required alignment of the transition on an audio frame boundary, this means that either ending audio samples from (any of) the source options must be removed and prepended to each of the target options, or that beginning audio samples from (any of) the target options must be removed and appended to each of the source options.

The decision whether to move audio from source to target options (which moves the transition to an earlier time) or from target to source options (which moves the transition to a later time) will depend on which leads to the least (or no) loss of audio data. We have two choices:
(a) Remove q samples from each source option and then prepend q samples to each target option. Here, q is the amount of samples needed to move the transition to the next earlier frame boundary.
(b) Remove r samples from each target option and then append r samples to each source option. Here, r is the amount of samples needed to move the transition to the next later frame boundary.

The following four scenarios exist.

Scenario 1: For each source option, its last q samples are identical to the last q samples of each other source option. Furthermore, for each target option, its first r samples are identical to the first r samples of each other target option.

In this case the transition is moved later in time, i.e., the first r samples from each target option are removed, and r samples are appended to each source option. No audio data is lost while moving samples between target and source options.

Moving the transition later in time is done because the last frame of samples (q+r is identical to the frame size) of each source option will now be identical, meaning that the last frame of each option that can be followed by a target option is identical, allowing for the perfect initialization of the history of the encoder.

FIG. 11 further illustrates this scenario. The last q samples 54 are identical for each of the source options n−2 and n−1. The first r samples 56 are identical for each of the target options n and n+1. The result, removing the first r samples from options n and n+1, and then appending one such segment of r samples (taken from either option n or n+1) to both options n−2 and n−1 is depicted in FIG. 12. As can be seen the transition 52 is now moved to the closest later frame boundary 50.

Scenario 2: For each source option, there is at least one other source option for which the last q samples are different between the two source options. Furthermore, for each target option its first r samples are identical to the first r samples of each other target option.

In this case the transition will also be moved later in time, i.e., the first r samples from each target option will be removed, and r samples will be appended to each source option. No audio data is lost while moving samples between target and source options. Note that the alternative, moving the transition earlier in time, would always lead to loss of audio data, which is disadvantageous.

Since r is always smaller than the frame size, the initialization of the history of the encoder will not be perfect, since the source options do not have a full frame of audio in common at the end. Therefore, for small values of r, audible artifacts might occur, depending on how much the last frames of the source options differ. If the last part of each source option is reasonably similar (which should be guaranteed by the creator of the personalized message), this will not lead to audible artifacts.

FIG. 14 further illustrates this scenario. The first r samples 56 are identical for each of the target options n+1 and n+2. The result, removing the first r samples from options n and n+1, and then appending one such segment of r samples (taken from either option n or n+1) to both options n−2 and n−1 is depicted in FIG. 15. As can be seen the transition 52 is now moved to the closest later frame boundary.

Scenario 3: For each source option its last q samples are identical to the last q samples of each other source option; Furthermore, for each target option, there is at least one other target option for which the first r samples are different between the two target options.

In this case the transition is moved earlier in time, i.e., the last q samples are removed from each source option, and q samples are prepended to each target option. No audio data is lost while moving samples between source and target options. Note that the alternative, moving the transition later in time would always lead to loss of audio data, which is disadvantageous.

After moving the samples, the source options will likely be different in their last frame. This means that the initialization of the audio history during encoding will be imperfect since the initialization can be done with the last frame from only one of the source options. If the last frames of all source options are reasonably similar (which should be guaranteed by the creator of the personalized message) this will usually not lead to audible artifacts.

FIG. 17 further illustrates this scenario. The last q samples 54 are identical for each of the source options n−1 and n−2. The result, removing the last q samples from options n−2 and n−1, and then appending one such segment of r samples (taken from either option n−2 or n−1) to both options n and n+1 is depicted in FIG. 18. As can be seen the transition 52 is now moved to the closest earlier frame boundary.

Scenario 4: For each source option, there is at least one other source option for which the last q samples are different between the two source options. For each target option, there is at least one other target option for which the first r samples are different between the two target options.

In this case some audio data will always be lost, no matter whether the transition point is moved to an earlier or later frame boundary. In specific embodiments of this invention, the following heuristics are used to decide in what direction to move the frame boundary:
(a) Move the transition in the direction that leads to removing the least number of audio samples, leading to the least amount of information that will be lost. This means, if q is smaller than r, the transition is moved to the closest earlier frame boundary, otherwise it is moved to the closest later frame boundary. The samples that are prepended/appended are chosen either randomly from the truncated options, or the samples are taken from a truncated option that is designated 'default' by the creator of the personalized message.
(b) Mathematically determine how much the last parts (q samples each) of the source options differ and how much the first parts (r samples each) of the target options differ. If the last parts of the source options are more similar than the first parts of the target options, the transition point is moved to the closest earlier frame boundary, otherwise to the closest later boundary. The samples that are prepended/appended can be chosen either randomly from one of the truncated options, a creator-assigned default option could be chosen, or a more complex algorithm, such as averaging the sample values over all truncated options, could be adopted.

Similarity of two sequences of samples can be determined using well-known mathematical algorithms that return a value between 0 (dissimilar) and 1 (identical). One example of a function that computes such a similarity is:

$$2*(\text{SUM}i\text{:}0<=i<N\text{:}s(i)*t(i))/(\text{SUM}i\text{:}0<=i<N\text{:}s(i)*s(i)+t(i)*t(i)),$$ (Equation 1)

where s and t are two sequences of sample values, each having a length of N samples.

It can easily be seen that this formula returns a value of 1 when all samples s(i) and t(i) are identical. The more the sample values differ, the closer to 0 this value will get.

The similarity of more than two sequences of samples can be determined by averaging the similarities of all possible pairs of sequences of samples.

FIG. 20 further illustrates this scenario. The last q samples 54 are different for each of the source options n−1 and n−2. The first r samples 56 are different for each of the target options n and n+1.

If the decision is made to move the transition point later in time, the result is depicted in FIG. 21. In this figure, the last q samples of each of the source options n−2 and n−1 are removed. One of the segments of q removed segments is prepended to each of the source options n and n+1.

If the decision is made to move the transition point earlier in time, the result is depicted in FIG. 22. In this figure, the first r samples of each of the target options n and n+1 are removed. One of the segments of r removed segments is appended to each of the source options n−1 and n−2.

No matter in what direction the audio transition point is moved, the last frames of the source options will not be identical. Depending on how much these last frames differ, and how much audio data is lost during the removal of audio samples, the transition will have inaudible, small or big artifacts during playout since the history buffer of the audio encoder for the target options cannot be initialized such that it is correct (seamless) for all possible transitions from source to target options.

It is very unlikely, that the ending of source fragments or the beginning of target fragments in a transition are very dissimilar, since this would mean that at least some transitions from source to target options will already have artifacts in the uncompressed case. This situation will likely be detected and repaired during creation of the personalized message. In the case that the last parts of the source options are reasonably similar, any of them could be used to provide the frame to be used for initializing the history of the audio encoder without leading to audible artifacts.

An example in which the last parts of options that are intended to be identical can actually differ is when the source options are captured from an analog tape. In this case, some sampling errors/jitter will occur during the capture process, leading to slight dissimilarities. However, these small differences will generally not lead to audible artifacts later on in the process.

After each transition in the template has been processed according to the mechanism just disclosed, either manually or mechanically, the last options in the template, i.e., those that have NO successors, and are the last ones that will be played, will be padded with silence (zero sample values) to make their length also an exact multiple of the frame length of the intended compression scheme. This to ensure that the audio encoder will not discard the last remaining part of each such last option because it is no complete frame in length.

Encoding

Assuming that alignment has been completed for all transitions/options in the personalized message, the last step part of this invention is actual encoding (compression) of the individual options.

The main difference between ordinary encoding of a standalone audio fragment and the encoding of an option in a personalized message is that options that can be played directly before that option to be encoded must be taken into account. It is necessary to encode at least one frame of the previous material before the actual fragment to be encoded to build the history of the psycho-acoustic block in a perceptual encoder such as one based on the MPEG and AC-3 compression standards. By building up history, the transition between options can be made perfectly seamless.

In case the option to be encoded is not preceded by a transition, i.e., has no options that can be played before it (because it will be always be played first in the personalized message), it is encoded as is, without needing any special processing.

If the option to be encoded is a target option in a transition, the last frame of any of the source options of that transition is temporarily prepended to the target option to be encoded. The resulting target option (prepended with one frame) is encoded. After encoding, the first frame is stripped-off from the encoded result. As mentioned, this first frame purely serves to build-up a history in the encoder to thus enable seamless transitions from any of the possible source options to this target option. The choice for the frame to be prepended is presented here as arbitrary, since alignment has already ensured that the last frame of each source option in a transition is identical to the last frame of any other of the source options, wherever possible. In the cases that this could not be accomplished (in certain 'junction' transitions), either a random choice can be made, a certain option that is marked as 'default' (e.g., by the creator of the personalized message) will be selected, or any other selection algorithm can be used.

Stripping a single frame from the beginning of a compressed audio file usually is a very simple algorithm. For example, in MPEG Layer II or AC-3 compressed audio, frames can be added and removed independently without invalidating the file. Also, each frame starts with a defined (sync) code that also contains the size of the frame, so the start of the next frame can be found easily.

As illustration, encoding for the various transition cases (branch, confluence, junction) is shown in a number of Figures.

FIG. 6 shows how encoding of target options takes place in a branch transition. The last frame 58 of the (single) source option is temporarily copied in front of each target option before encoding.

FIG. 10 shows how encoding of target options takes place in a confluence transition. Any of the (identical) last frames 60 of the source options is taken and temporarily copied in front of each target option before encoding FIG. 13 shows how encoding of target options takes place in scenario 1 of a junction transition. Any of the (identical) last frames 54+56 of the source options is taken and temporarily copied in front of each target option before encoding.

FIG. 16 shows how encoding of target options takes place in scenario 2 of a junction transition. One of the (only partly identical) last frames 54+56 of the source options is taken and temporarily copied in front of each target option before encoding.

FIG. 19 shows how encoding of target options takes place in scenario 3 of a junction transition. One of the (different)

last frames 62 of the source options is taken and temporarily copied in front of each target option before encoding.

It can easily be seen that the encoding of the target options in scenario 4 of a junction transition is very similar to that of FIG. 19: One of the (different) last frames 62 of the source options (see also FIG. 21 and FIG. 22) is taken and temporarily copied in front of each target option before encoding.

Although the invention has been shown and described with respect to illustrative embodiments thereof, various other changes, omissions and additions in the form and detail thereof may be made therein without departing from the spirit and scope of the invention. It can easily be seen by someone moderately skilled in the art that the invention can be applied in any domain where separate audio fragments must be compressed and concatenated or selected later. Domains include DVD, Digital television, Internet streaming media, and many others.

What is claimed is:

1. A method of preparing a plurality of digital audio fragments to allow switching between at least one source audio fragment and at least one target audio fragment said method comprising:
    aligning an end of said at least one source audio fragment, the source audio fragment having a length which is not an exact multiple of a frame size of an encoding system, with a beginning of said at least one target audio fragment, for all possible valid combinations of said at least one source audio fragment and said at least one target audio fragment;
    altering said at least one source audio fragment and at least one target audio fragment such that the at least one source audio fragment is made to be a length that is an exact multiple of the frame size; and
    encoding the at least one source audio fragment and the at least one target audio fragment according to the encoding system.

2. The method of claim 1, wherein altering the at least one source audio fragment and the at least one target audio fragment further comprises:
    moving a sequence of audio samples from at least one a digital audio fragment to at least one other digital audio fragment.

3. The method of claim 2 wherein said moved sequence of audio samples is a length which will result in said at least one source audio fragment to be a length that is an exact multiple of the frame size.

4. The method of claim 1 wherein altering the at least one source audio fragment and the at least one target audio fragment further comprises:
    moving a sequence of audio samples from said end of said at least one source audio fragment to said beginning of said at least one target audio fragment; wherein said sequence of audio samples is a length which will shorten said at least one source audio fragment to be a length that is an exact multiple of said frame size.

5. The method of claim 1 wherein altering the at least one source audio fragment and the at least one target audio fragment, further comprises:
    moving a sequence of audio samples from said beginning of said at least one target audio fragment to said end of said at least one source audio fragment wherein said sequence of audio samples is a length which will lengthen said at least one source audio fragment to be a length that is an exact multiple of said frame size.

6. The method of claim 5 further including:
    moving a second sequence of audio samples from said beginning of said at least one target audio fragment to said end of said at least one source audio fragment wherein said second sequence of audio samples is a length equal to said frame size.

7. The method of claim 1, wherein encoding the at least one source audio fragment and the at least one target audio fragment according to the encoding system further comprises encoding a sequence of frames wherein a subsequent frame encoding is dependent upon an encoding of at least one preceding frame.

8. The method of claim 1, wherein altering the at least one source audio fragment and the at least one target audio fragment further comprises moving identical audio samples from the beginnings of said target audio fragments to the ends of said source audio fragments so that the resulting ends of said source audio fragments align at an exact multiple of said frame size, and the resulting last frames of each of said source audio fragments are identical.

9. The method of claim 1, wherein altering the at least one source audio fragment and the at least one target audio fragment further comprises moving identical audio samples from the beginnings of said target audio fragments to the ends of said source audio fragments so that the ends of said source audio fragments align at an exact multiple of said frame size, and wherein at least one audio sample is identical at the end of all of said source audio fragments, however the last full frame of audio samples are not identical for all said source audio fragments.

10. The method of claim 1, wherein altering the at least one source audio fragment and the at least one target audio fragment further comprises moving identical audio samples from the ends of said source audio fragments to the beginnings of said target audio fragments so that the resulting ends of said source audio fragments align at an exact multiple of said frame size, wherein at least one audio sample is identical at the beginnings of all of said target audio fragments, however the first full frame of audio samples is not identical for all said target audio fragments.

11. The method of claim 1, wherein altering the at least one source audio fragment and the at least one target audio fragment further comprises moving audio samples from the beginning of a first target audio fragment to the ends of said source audio fragments; and removing an identical number of audio samples from the beginnings of at least one remaining target audio fragment, so that the resulting ends of said source audio fragments align at an exact multiple of said frame size.

12. The method of claim 1, wherein altering the at least one source audio fragment and the at least one target audio fragment further comprises moving audio samples from the end of a first source audio fragment to the beginnings of said target audio fragments; and removing an identical number of audio samples from the ends of at least one remaining source audio fragment, so that the resulting ends of said source audio fragments align at an exact multiple of said frame size.

13. The method of claim 1, wherein at least one digital audio fragment has an end time that is later than the beginning time of any other digital audio fragments, and wherein an end of said at least one digital audio fragment is aligned at an exact multiple of said frame size by adding empty audio samples to the end of said at least one audio fragment.

14. The method of claim 7, further including:
    copying a last frame of a source audio fragment to the beginning of at least one target audio fragment;
    encoding said at least one target audio fragment using said encoding system; and
    removing data from the beginning of said compressed at least one target audio fragment, said data corresponding to a first frame of said at least one target audio fragment.

15. A system for preparing a plurality of digital audio fragments for transmission to allow a switching device to switch between at least one source audio fragment and at least one target audio fragment; said system comprising:
- an audio aligner module, coupled to a source of said plurality of audio fragments, at least a plurality of which have lengths that are not an exact multiple of a frame size of an encoding system, configured to align beginnings and ends of said plurality of audio fragments to selected times based on an exact multiple of the frame size;
- an audio encoding module, coupled to said audio aligner module, configured to encode said plurality of audio fragments as a sequence of frames, wherein each frame comprises a sequence of audio samples; and wherein a length of said frame is said frame size.

16. The system of claim 15, wherein said plurality of audio fragments are transmitted using a transport mechanism selected from one of MPEG compliant, digital television, DVD broadcast, DVD storage, CD ROM, and the Internet.

17. The system of claim 15, wherein said plurality of audio fragments are encoded using AC-3.

18. The system of claim 15, wherein said plurality of audio fragments are encoded using MPEG Layer II.

19. A switching apparatus, to switch between a plurality of audio fragments, comprising:
- a switching component configured to switch between at least one source audio fragment and at least one target audio fragment;
- wherein said audio fragments are prepared by:
  - aligning an end of at least one source audio fragment, the source audio fragment having a length which is not an exact multiple of a frame size of an encoding system, with a beginning of at least one target audio fragment;
  - altering said at least one source audio fragment and at least one target audio fragment such that the at least one source audio fragment is made to be a length that is an exact multiple of the frame size; and
  - encoding the at least one source audio fragment and the at least one target audio fragment according to the encoding system.

20. The switching apparatus of claim 19 wherein said switching apparatus is configured to receive said plurality of audio fragments transmitted using a transport mechanism selected from one of MPEG compliant, digital television, DVD broadcast, DVD storage, CD ROM, and the Internet.

21. The switching apparatus of claim 19 wherein said switching apparatus is a receiver for MPEG encoded media streams.

22. The switching apparatus of claim 19 wherein said switching apparatus is selected from one of a set top box, a DVD player, a personal computer, a digital television set, a video server, and a video on demand server.

23. The switching apparatus of claim 19, further comprising a memory module, said memory module configured to receive at least one target audio fragment at a time before switching to said at least one target audio fragment.

* * * * *